(12) United States Patent
Howard

(10) Patent No.: US 11,117,065 B2
(45) Date of Patent: Sep. 14, 2021

(54) SYSTEMS AND METHODS FOR LYNCHPIN STRUCTURE APPLICATIONS

(71) Applicant: T. Dashon Howard, Chicago, IL (US)

(72) Inventor: T. Dashon Howard, Chicago, IL (US)

( * ) Notice: Subject to any disclaimer, the term of this patent is extended or adjusted under 35 U.S.C. 154(b) by 0 days.

(21) Appl. No.: 16/733,536

(22) Filed: Jan. 3, 2020

(65) Prior Publication Data

US 2021/0205727 A1 Jul. 8, 2021

(51) Int. Cl.
*A63H 33/04* (2006.01)
*G09B 23/18* (2006.01)
*G09B 23/04* (2006.01)

(52) U.S. Cl.
CPC ........... *A63H 33/042* (2013.01); *G09B 23/04* (2013.01); *G09B 23/188* (2013.01); *A63H 33/046* (2013.01)

(58) Field of Classification Search
CPC ............................ A63H 33/042; B64C 39/024
USPC .................................. 244/23 R–23 D; 440/6
See application file for complete search history.

(56) References Cited

U.S. PATENT DOCUMENTS

| | | | | |
|---|---|---|---|---|
| 3,204,891 A * | 9/1965 | Cline | ..................... | A63H 27/12 244/23 R |
| 4,149,337 A * | 4/1979 | Habisohn | ............... | A63H 33/28 131/198.1 |
| 4,380,133 A * | 4/1983 | Arnstein | ................ | A63H 33/16 428/542.8 |
| 4,676,507 A * | 6/1987 | Patterson | ................. | A63F 9/12 273/160 |
| 5,630,587 A * | 5/1997 | Zlotsky | ................... | A63F 9/088 273/155 |
| 5,645,248 A * | 7/1997 | Campbell | ................. | B64B 1/00 244/125 |
| 5,785,563 A * | 7/1998 | Peaslee | .................. | A63B 43/00 114/315 |
| 7,029,364 B1 * | 4/2006 | Thomasson | ............ | G09B 23/00 446/388 |

(Continued)

OTHER PUBLICATIONS

University of British Columbia, Dodecahedron, uploaded Oct. 29, 2020, University of British Columbia, 2 pages.*

(Continued)

*Primary Examiner* — Eugene L Kim
*Assistant Examiner* — Matthew B Stanczak
(74) *Attorney, Agent, or Firm* — Schwegman Lundberg & Woessner, P.A.

(57) ABSTRACT

A Lynchpin structure may be combined with one or more additional Lynchpin structures to form a compound Lynchpin propulsion structure. Each Lynchpin structure may include six pentangular areas, and one or more of the pentangular areas may include a propulsion device. The propulsion may be used to propel the compound Lynchpin propulsion structure through or over various media, such as through air, across ground, on or underwater, or through or over other media. The propulsion may include avionic propulsion, ground propulsion, hydrodynamic propulsion, or other types of propulsion. A single type of propulsion device may be used within one or more of the pentangular areas, or diverse types of propulsion may be used to provide various navigational performance or multi-mode operation. Each propulsion device may also include a device to direct the propulsion, such as a single or multi-axis gimble or adjustable aerodynamic control surface.

8 Claims, 24 Drawing Sheets

(56) References Cited

U.S. PATENT DOCUMENTS

| | | | | |
|---|---|---|---|---|
| 7,407,424 B2* | 8/2008 | Choi | ............ | G01S 5/26 446/175 |
| 8,220,408 B2* | 7/2012 | Stone | ............ | G01S 15/8922 114/312 |
| 8,528,854 B2* | 9/2013 | Yan | ............ | A63H 27/12 244/17.23 |
| 9,004,397 B2* | 4/2015 | Pecnik | ............ | B64B 1/58 244/30 |
| D867,207 S * | 11/2019 | O'Brien | ............ | D12/16.1 |
| 10,696,394 B2* | 6/2020 | Chang | ............ | B64C 37/02 |
| D892,225 S * | 8/2020 | Liao | ............ | D21/447 |
| 2002/0104921 A1* | 8/2002 | Louvel | ............ | A63H 27/04 244/12.1 |
| 2006/0105666 A1* | 5/2006 | von Oech | ............ | A63H 33/04 446/85 |
| 2008/0040984 A1* | 2/2008 | Lanahan | ............ | E02B 3/04 52/79.9 |
| 2010/0224723 A1* | 9/2010 | Apkarian | ............ | B64C 27/20 244/65 |
| 2011/0036040 A1* | 2/2011 | Child | ............ | A63F 9/12 52/588.1 |
| 2011/0237152 A1* | 9/2011 | Redpath | ............ | A63H 33/22 446/71 |
| 2012/0158215 A1* | 6/2012 | Sun | ............ | B64C 27/20 701/3 |
| 2012/0171923 A1* | 7/2012 | Hadden | ............ | A63H 33/006 446/227 |
| 2013/0165012 A1* | 6/2013 | Klauber | ............ | A63H 33/042 446/91 |
| 2013/0183881 A1* | 7/2013 | Kamiyama | ............ | A63F 9/06 446/87 |
| 2014/0357151 A1* | 12/2014 | Worley | ............ | A63H 33/046 446/92 |
| 2014/0374532 A1* | 12/2014 | Duffy | ............ | G05D 1/104 244/2 |
| 2015/0079871 A1* | 3/2015 | Howard | ............ | A63H 33/40 446/92 |
| 2015/0079872 A1* | 3/2015 | Howard | ............ | A63H 33/046 446/92 |
| 2015/0283474 A1* | 10/2015 | Howard | ............ | G09B 23/04 446/91 |
| 2016/0101368 A1* | 4/2016 | Rehkemper | ............ | A63H 27/12 446/58 |
| 2016/0129361 A1* | 5/2016 | Howard | ............ | A63H 33/14 446/92 |
| 2016/0228786 A1 | 8/2016 | Howard | | |
| 2016/0376001 A1 | 12/2016 | Felix | | |
| 2017/0157768 A1* | 6/2017 | Buthala | ............ | A63H 33/046 |
| 2017/0313418 A1* | 11/2017 | Yoon | ............ | B64C 27/20 |
| 2018/0170533 A1* | 6/2018 | Lee | ............ | B64C 39/024 |
| 2018/0186450 A1 | 7/2018 | Chang | | |
| 2018/0194463 A1* | 7/2018 | Hasinski | ............ | B64C 39/024 |
| 2019/0299112 A1* | 10/2019 | Howard | ............ | G10K 11/04 |
| 2019/0389575 A1* | 12/2019 | Kirkbride | ............ | F16B 1/00 |
| 2020/0033851 A1* | 1/2020 | Hajimiri | ............ | G05D 1/0027 |
| 2020/0130795 A1* | 4/2020 | Fikes | ............ | B63G 8/22 |
| 2020/0189712 A1* | 6/2020 | Briod | ............ | B64C 39/024 |

OTHER PUBLICATIONS

"International Application Serial No. PCT/US2020/066867, International Search Report dated Mar. 4, 2021", 2 pgs.

"International Application Serial No. PCT/US2020/066867, Written Opinion dated Mar. 4, 2021", 6 pgs.

* cited by examiner

SYSTEMS AND METHODS FOR LYNCHPIN STRUCTURE APPLICATIONS

FIELD

The present invention relates to educational, combinable structures.

BACKGROUND

Planar geometric structures may be assembled in various configurations to form different three-dimensional (3-D) geometric structures, and may be collapsed into substantially planar configurations. The structures may be used as an educational toy by children, or may be used by adults or children to explore various two-dimensional or three-dimensional shapes.

DETAILED DESCRIPTION

Lynchpin structures may be formed from one or more basic polygons or other shapes. Lynchpin structures may include magnetic materials (e.g., magnets, ferromagnetic metals), piezoelectric materials, or lights (e.g., LEDs). Lynchpin structures may be combined to form or give the appearance of various geometric structures, and the included magnetic materials may be used to retain the formed geometric structure shape. A Lynchpin structure may be formed from six pentagons, as described below.

A Lynchpin structure may be combined with one or more additional Lynchpin structures to form a compound Lynchpin propulsion structure. Each Lynchpin structure may include six pentagonal areas, and one or more of the pentagonal areas may include a propulsion device. The propulsion may be used to propel the compound Lynchpin propulsion structure through or over various media, such as through air, across ground, on or underwater, or through or over other media. The propulsion may include avionic propulsion, ground propulsion, hydrodynamic propulsion, or other types of propulsion. A single type of propulsion device may be used within one or more of the pentangular areas, or diverse types of propulsion may be used to provide various navigational performance or multi-mode operation. Each propulsion device may also include a device to direct the propulsion, such as a single or multi-axis gimble or adjustable aerodynamic control surface.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be used, and that structural, logical, and electrical changes may be made without departing from the scope of the present invention. The following description of example embodiments is, therefore, not to be taken in a limited sense, and the scope of the present invention is defined by the appended claims.

Figure 1A:
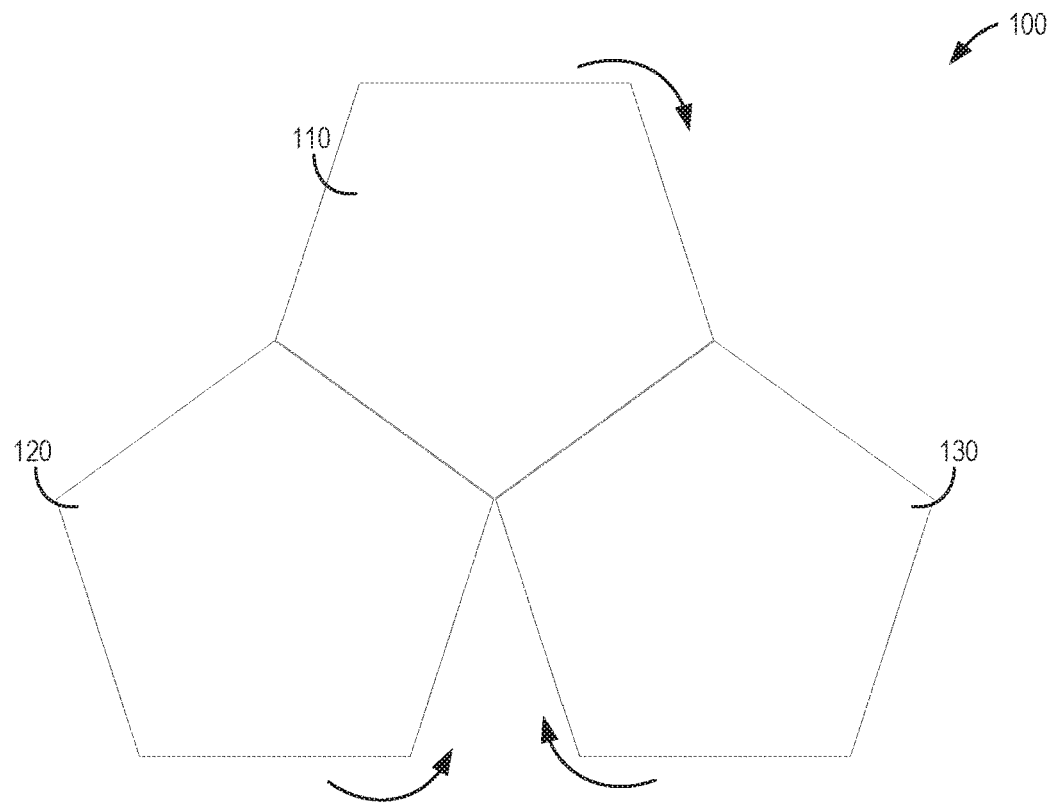
FIGS. 1A-1B are front and perspective views of three planar shapes joined on different sides to form a 3-D geometric structure, according to an embodiment.
Figure 1B:
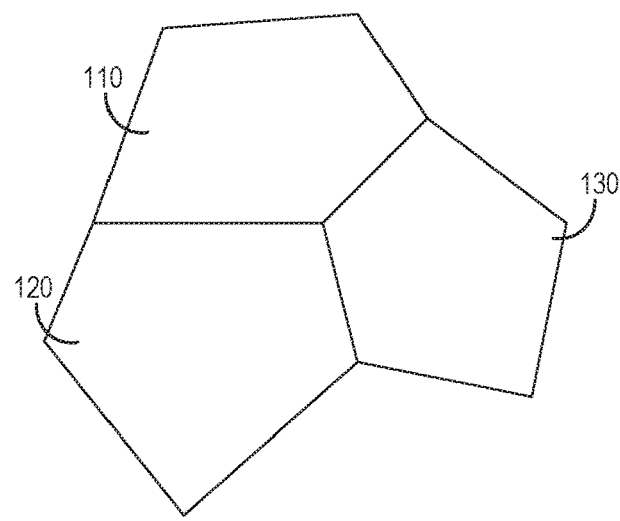

FIGS. 1A-1B are front and perspective views of three planar shapes joined on different sides to form a 3-D geometric structure 100, according to an embodiment. The planar shapes may include three regular pentagons 110, 120, and 130. Two or more of the pentagons may be attached on a side to form a hinge, such as is shown in FIG. 1A. Each hinge may be constructed using a flexible material or a mechanical hinge. In some embodiments, one or more of the planar shapes may be collapsed (e.g., closed) toward each other, and may form a 3-D shape. For example, pentagons 120 and 130 shown in FIG. 1A may be folded toward each other to form the 3-D shape shown in FIG. 1B. In other embodiments, one or more of the planar shapes may be collapsed (e.g., closed) toward each other to become flush (e.g., coplanar) to form a multiple layer, substantially planar object. For example, pentagons 120 and 130 shown in FIG. 1A may be folded toward each other to form a single, three-layer pentagon.

Figure 2A:
FIGS. 2A-2B are front and perspective views of three planar shapes joined on a single side to form a 3-D geometric structure, according to an embodiment.
Figure 2B:
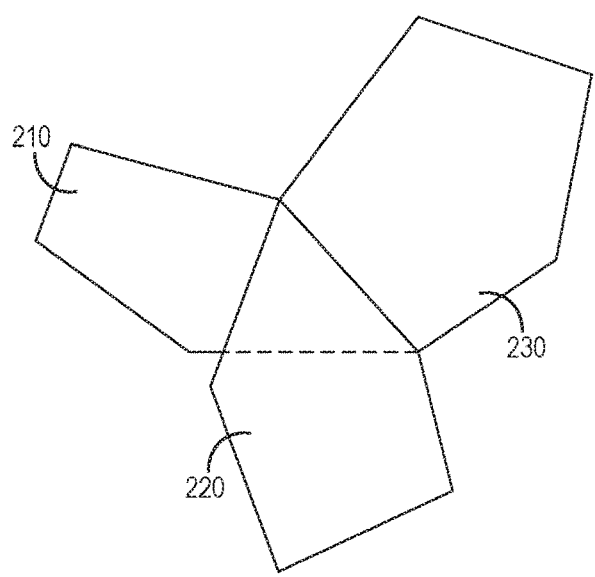

FIGS. 2A-2B are front and perspective views of three planar shapes joined on a single side to form a 3-D geometric structure 200, according to an embodiment. The planar shapes may include three regular pentagons 210, 220, and 230. The planar shapes may be joined on a common edge to form a 3-D structure, such as is shown in FIGS. 2A-2B.

Figure 3A:
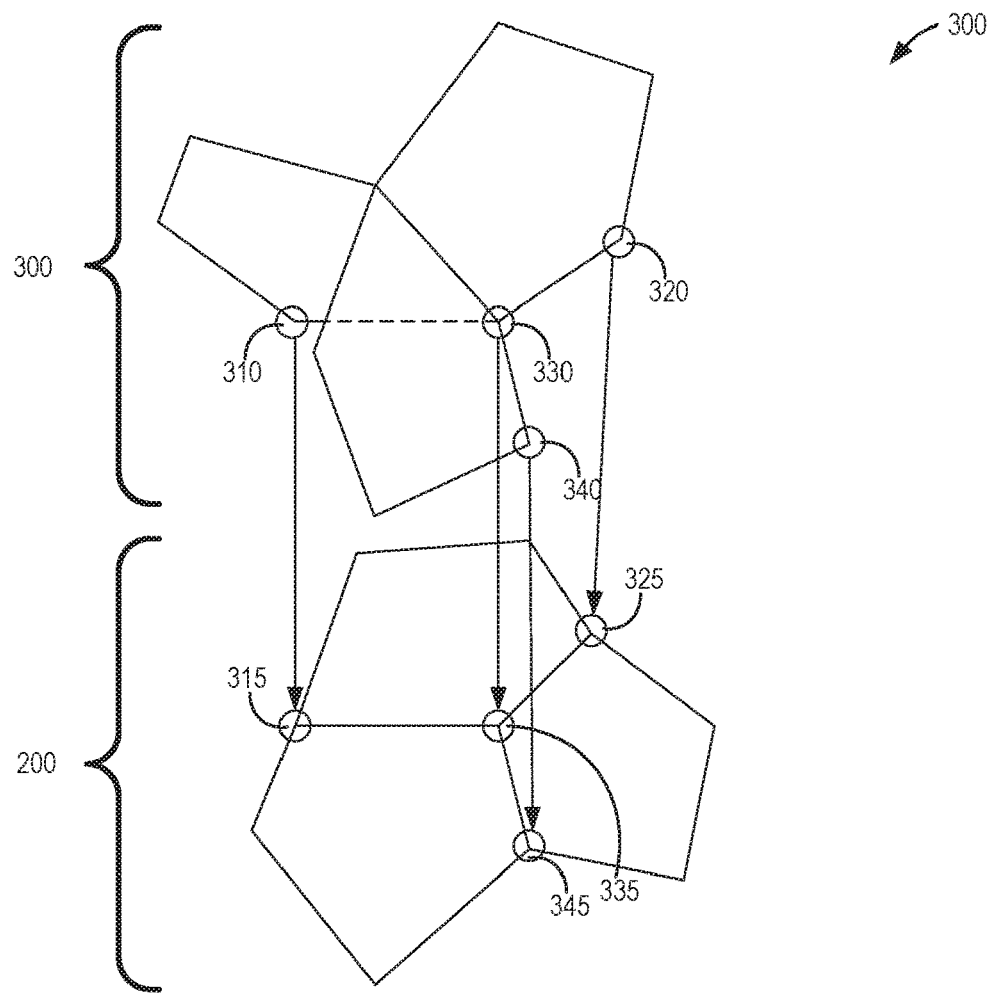
FIGS. 3A-3B are perspective views of combining two 3-D geometric structures to form a larger 3-D geometric structure, according to an embodiment.
Figure 3B:
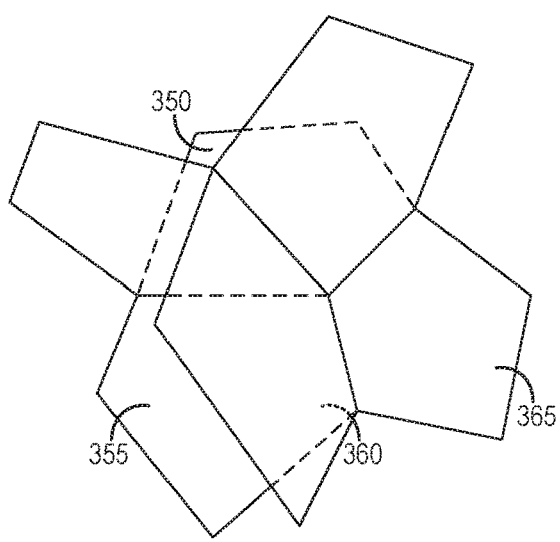

FIGS. 3A-3B are perspective views of combining two 3-D geometric structures to form a larger 3-D geometric structure 300, according to an embodiment. Two 3-D geometric structures may be joined together to form a larger 3-D geometric structure. In an example, the 3-D geometric structure 300 shown in FIG. 3B may be attached to the 3-D geometric structure 200 shown in FIG. 2B. In this example, point 310 may be joined to point 315, point 320 may be joined to point 325, point 330 may be joined to point 335, and point 340 may be joined to point 345 to form a six-sided 3-D geometric structure 300 shown in FIG. 3B, referred to herein as a Lynchpin.

The Lynchpin structure 300 shown in FIG. 3B may include four pyramidal inner spaces 350, 355, 360, and 366. Each pyramidal inner space may be shaped similar to the 3-D shape shown in FIG. 2B. The planar pentagonal surfaces may include magnetic materials or electrically conductive lines, and may be used to create or modify a magnetic field or an electric field. The magnetic or electric field may have an associated resonance. The magnetic or electric field may be created or modified for the entire Lynchpin structure 300, or the magnetic or electric field may be created or modified separately modified for each of the four pyramidal inner spaces 350, 355, 360, and 366.

Power may be provided to the electrically conductive planar shapes through a power storage element (e.g., capacitor, battery) or through a power-generating element (e.g., solar cell, piezoelectric component). For example, a piezoelectric component may be used to convert sound into electricity, and the electricity may be used to create an electric field around one or more of the four pyramidal inner spaces 350, 355, 360, and 366.

Various sides may be joined using hinges, and may be collapsed toward each other to form a multiple layer, substantially planar object. Various sides may be held in a fixed position using magnetic or electromagnetic materials. For example, a multiple layer, substantially planar object may be manually arranged into the Lynchpin structure 300 shown in FIG. 3B. Various sides may be moved into a selected position using magnetic or electromagnetic materials. For example, applying a magnetic or electromagnetic field to a multiple layer, substantially planar object may cause the object to be arranged into the Lynchpin structure 300 shown in FIG. 3B.

Figure 4:
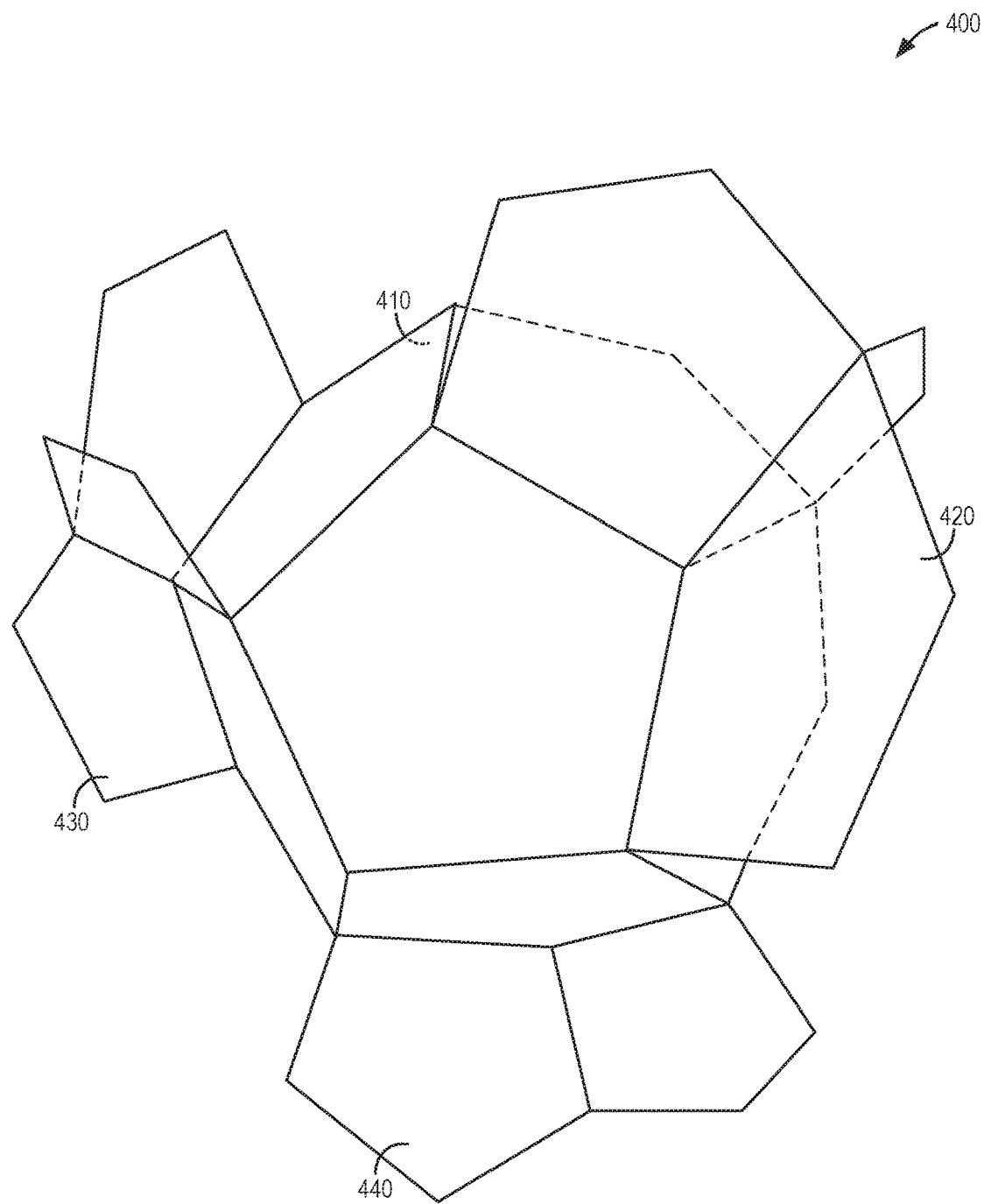
FIG. 4 is a perspective view of a modified dodecahedron formed from four Lynchpin structures, according to an embodiment.

FIG. 4 is a perspective view of a modified dodecahedron 400 formed from four Lynchpin structures, according to an embodiment. A dodecahedron may include one or more Lynchpin surfaces. An inner dodecahedron may be formed from four of the Lynchpin structures shown in FIG. 4B, as shown in various orientations in FIG. 4 as 410, 420, 430, and 440. Various surfaces may be moved into a selected position using magnetic or electromagnetic materials. For example, applying a magnetic or electromagnetic field may cause the object to be arranged into the modified dodecahedron 400 shown in FIG. 4. Each modified dodecahedron 400 may be used as a building block, and the planar surfaces extending beyond the twelve-sided dodecahedron surface may be used to combine two or more modified dodecahedrons 400.

Figure 5:
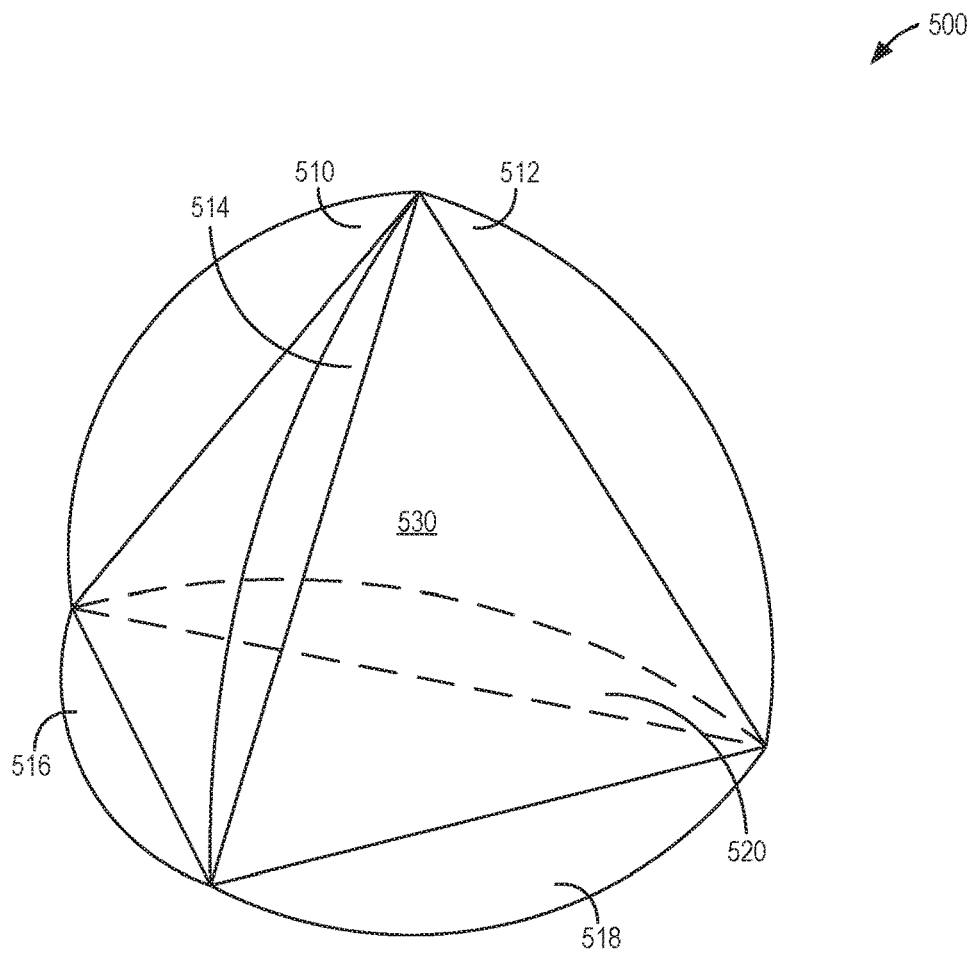
FIG. 5 is a perspective view of a tetrahedral building block, according to an embodiment.

FIG. 5 is a perspective view of a tetrahedral building block 500, according to an embodiment. The tetrahedral building block 500 may include four connected circular faces. The flanges of four such circular faces may be connected to form tetrahedral flanges 510, 512, 516, 518, and 520. The circular faces may be connected such that the flanges 510, 512, 516, 518, and 520 are flat, and the triangles inscribed in each of the four connected circular faces may form a tetrahedral inner space 530. In other embodiments, the circular faces may be connected at or near the circumference of each circular face such that the flanges 510, 512, 516, 518, and 520 define an inner volume (e.g., inner pocket). The outermost arcuate portions of the tetrahedral flanges 510, 512, 516, 518, and 520 may define a spherical volume that corresponds with the circumscribed sphere (e.g., circumsphere) surrounding the tetrahedral inner space 530.

The tetrahedral building block 500 may be transparent, may be translucent, may include a semi-transparent material comprised of a color, or may include a solid (e.g., opaque) material. The tetrahedral inner space 530 may include one or more gasses, such as noble gasses or gasses that are translucent or colored. The tetrahedral inner space 530 may include one or more fluids (e.g., gasses or liquids). The fluid may be selected according to its response to solar heating. For example, a fluid may expand in response to solar heating and cause the flanges to open. In another example, a fluid with a high heat capacity may store energy received from solar heating, such as in concentrated solar power applications. The fluid may be selected according to its ability to change color or light absorption. For example, a suspended particle fluid may transition from a clouded appearance to a translucent appearance in the presence of an electrical voltage. Various levels of transparency or various shades of color may be used for each side of the tetrahedral inner space 530 or for each of the tetrahedral flanges 510, 512, 516, 518. The use of semi-transparent materials of diverse colors may allow the colors to be combined depending on orientation. For example, if the device is held so a blue face is superimposed on a yellow face, the object may appear green. Similarly, multiple tetrahedral building blocks 500 may be combined to yield assorted colors. Multiple tetrahedral building blocks 500 may be combined to form the appearance of various platonic solids, where the platonic solid appearance may depend on each tetrahedral building block's specific periodicities of motion and wave positions in time as indicated by the direction of particular intersecting linear projections. For example, the vertices of four tetrahedral building blocks 500 using tetrahedral configurations may be combined to form a larger tetrahedron, where the larger tetrahedron maintains the one-hundred-and-twenty-degree angle at each of its vertices. Multiple tetrahedral building blocks 500 may be combined to form various other building blocks, such as is shown in FIG. 6.

Figure 6:
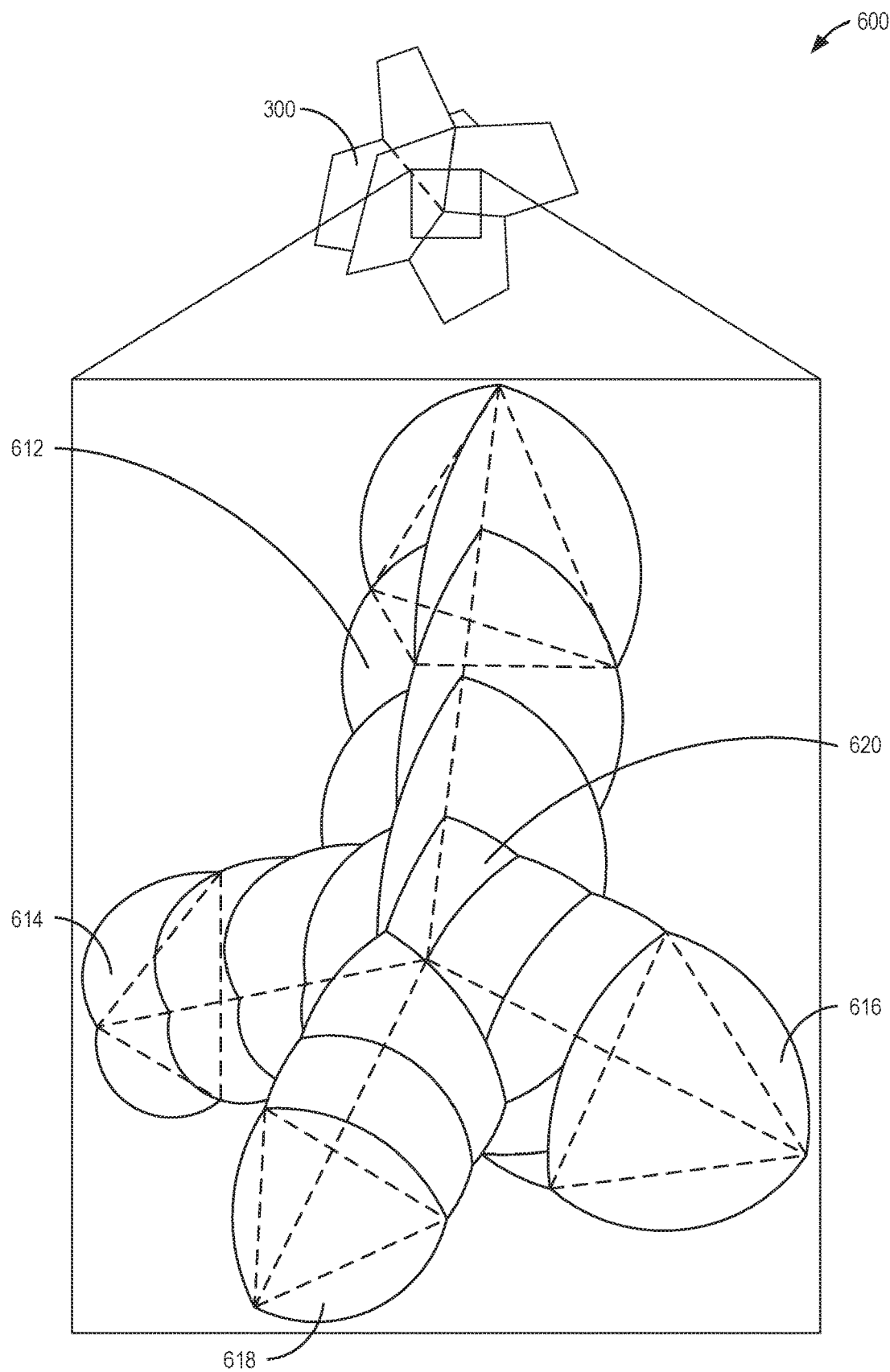
FIG. 6 is a perspective view of multiple tetrahedral building blocks combined to form an extended tetrahedral structure, according to an embodiment.

FIG. 6 is a perspective view of multiple tetrahedral building blocks combined to form an extended tetrahedral structure 600, according to an embodiment. The extended tetrahedral structure 600 may include four branches of tetrahedral building blocks with collapsed sides 612, 614, 616, and 618, and one base tetrahedral building block 620 with no collapsed sides. The extended tetrahedral structure 600 may form an interior of a structure, such as the Lynchpin structure 300 shown in FIG. 3B. Additional nested tetrahedral building blocks may be used to form all of the edges and vertices of the Lynchpin structure 400, such as is shown in FIG. 5.

Figure 7:
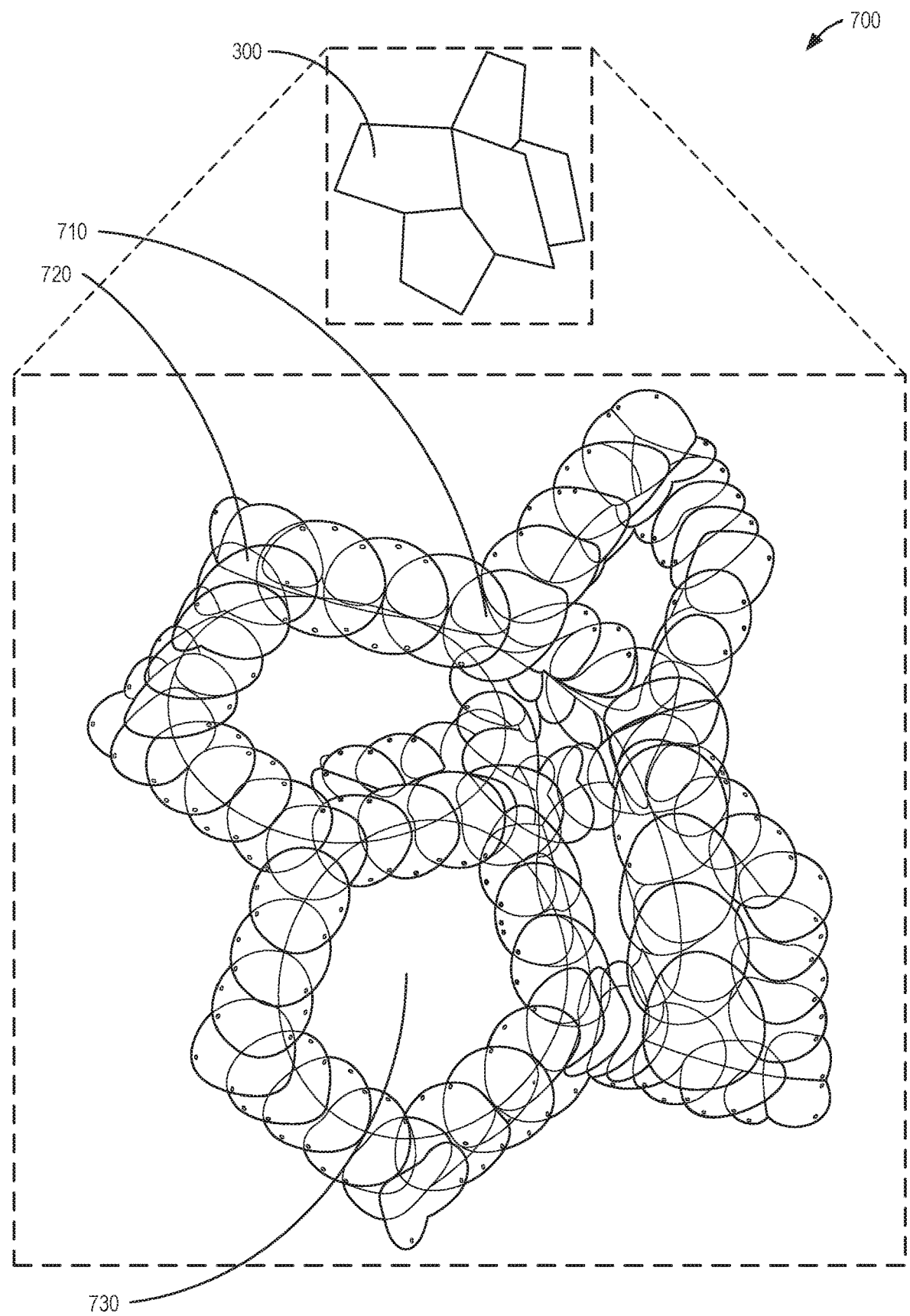
FIG. 7 is a perspective view of a tetrahedrally supported Lynchpin structure, according to an embodiment.

FIG. 7 is a perspective view of a tetrahedrally supported Lynchpin structure 700, according to an embodiment. Each of the four branches of tetrahedral building blocks shown in FIG. 6 may be extended to form a new four-branch vertex, such as at four-branch vertex 710. From each of the four-branch vertices at the ends of the four branches, additional tetrahedral building blocks may be used to extend additional branches to a two-branch vertex, such as at two-branch vertex 720. This structure may be used to form the edges for a structure, such as edges for the Lynchpin structure 300 shown in FIG. 3B. Each of the planar surfaces within the tetrahedrally supported Lynchpin structure 700 may be pentangular, and may be supported by one or more substantially planar pentangular reinforcements or circular reinforcements, such as shown at circular inner surface 730.

Figure 8:
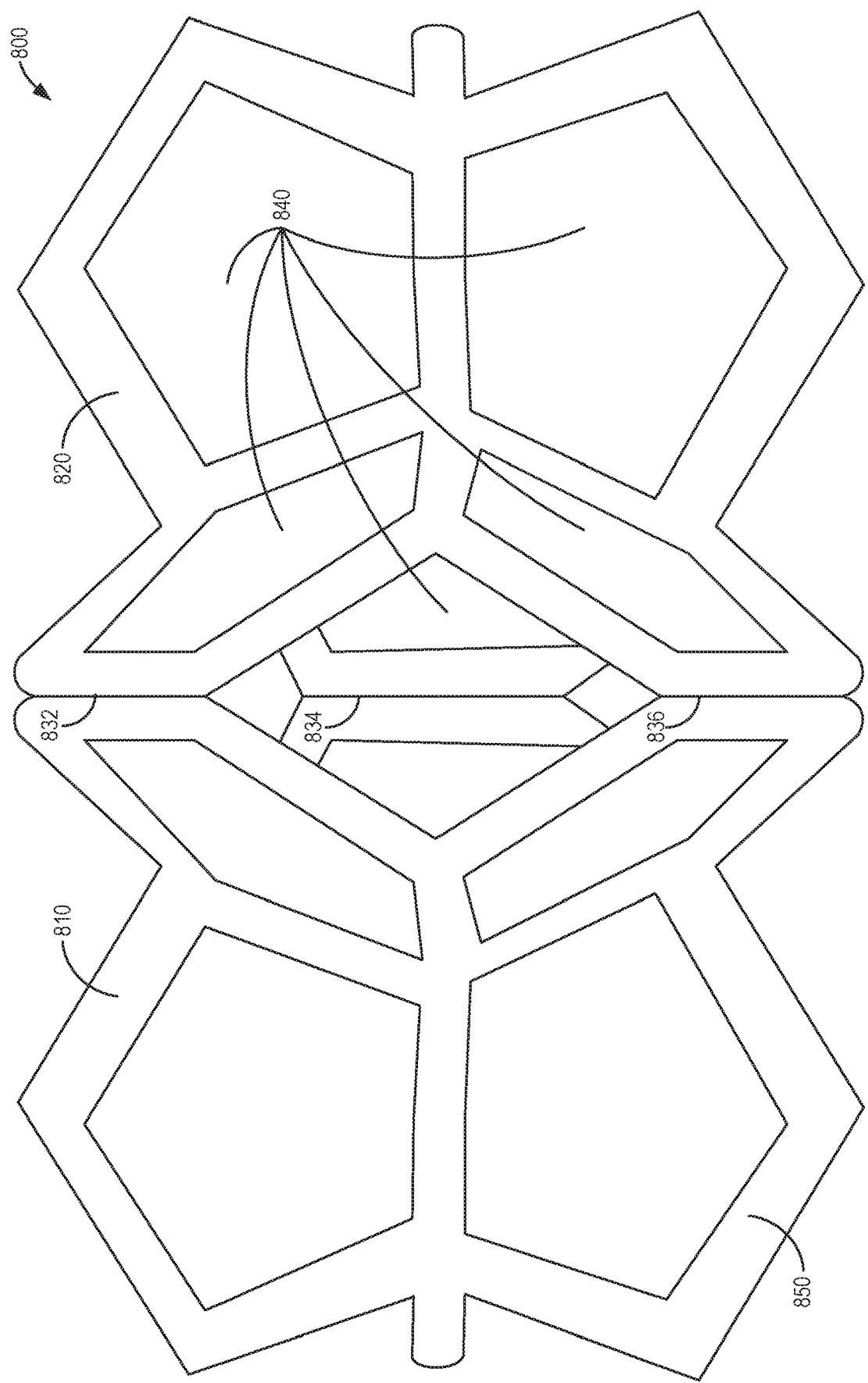
FIG. 8 is a perspective view of a lateral compound Lynchpin structure, according to an embodiment.

FIG. 8 is a perspective view of a lateral compound Lynchpin structure 800, according to an embodiment. Structure 800 may include a first Lynchpin structure 810 and a second Lynchpin structure 820. The two Lynchpin structures may be joined along three mated flanges 832, 834, and 836. Each Lynchpin structure may include six pentangular surfaces, such as surfaces 840. Each Lynchpin structure may include an external support structure 850, such as the tetrahedrally supported Lynchpin structure 700 shown in FIG. 7. The pentangular surfaces 840 may include pentangular reinforcements or circular reinforcements, or may include one or more propulsion devices as shown in FIG. 9.

Figure 9:
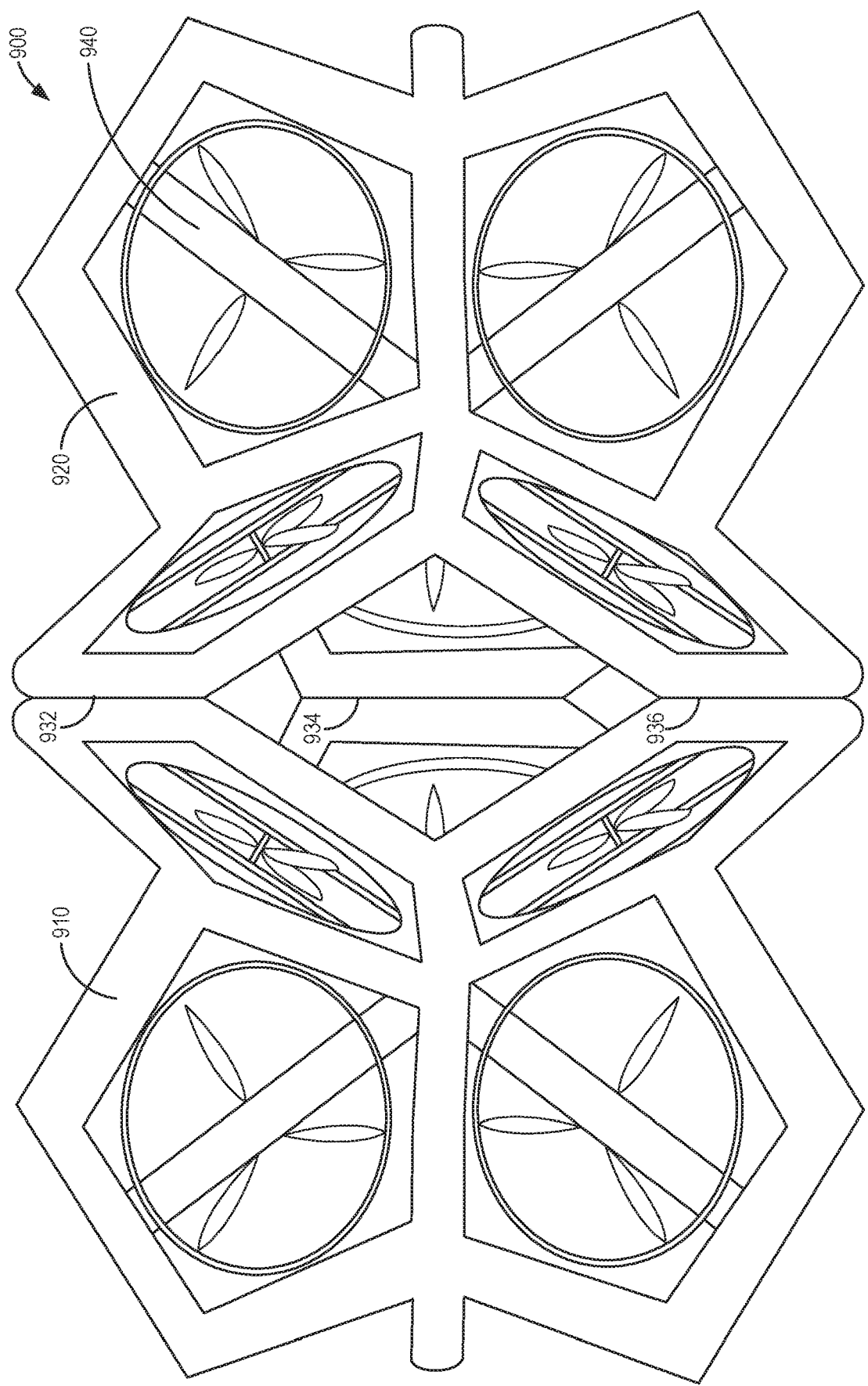
FIG. 9 is a perspective view of a compound Lynchpin propulsion structure, according to an embodiment.

FIG. 9 is a perspective view of a compound Lynchpin propulsion structure 900, according to an embodiment. Structure 900 may include a first Lynchpin structure 910 and a second Lynchpin structure 920, which may be joined along mated flanges 932, 934, and 936. Each Lynchpin structure may include six pentangular areas, and one or more of the pentangular areas may include a propulsion device 940. The propulsion device 940 may include several types of propulsion, which may be used to propel the compound Lynchpin propulsion structure 900. In the example shown in FIG. 9, the propulsion includes avionic propulsion generated by an engine and a device to generate thrust, such as a propeller. The propulsion may be used to propel the compound Lynchpin propulsion structure 900 through or over various media, such as through air, across ground, on or underwater, or through or over other media. The propulsion may include avionic propulsion, ground propulsion, hydrodynamic propulsion, or other types of propulsion. The propulsion may include a propulsion system that is mechanical (e.g., propeller, turbine), electrical (ion propulsion. Hall effect propulsion, molecular excitation), or electromechanical (e.g., maglev). A single type of propulsion device 940 may be used within one or more of the pentangular areas, or diverse types of propulsion may be used to provide various navigational performance or multi-mode operation. For example, some of the pentangular areas may include a type of propulsion suited for efficient avionic transportation, and other pentangular areas may include a type of propulsion suited for efficient ground transportation. Each propulsion device 940 may also include a device to direct the propulsion, such as a single or multi-axis gimble, an adjustable aerodynamic control surface (e.g., a flap), a restriction device (e.g., diaphragm shutter), or other propulsion direction device.

Figure 10:
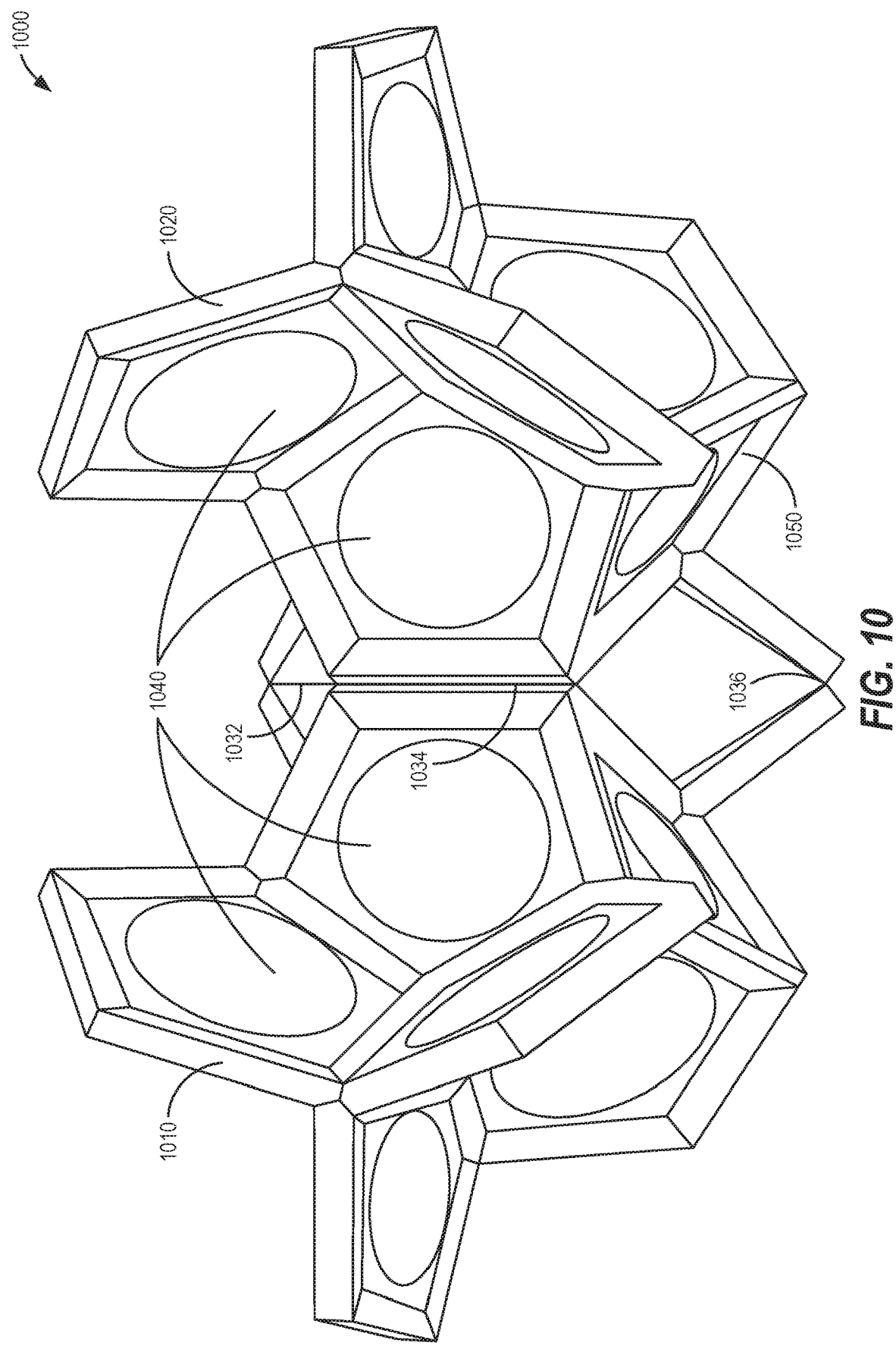
FIG. 10 is a perspective view of a lateral compound Lynchpin structure, according to an embodiment.

FIG. 10 is a perspective view of a lateral compound Lynchpin structure 1000, according to an embodiment. Structure 1000 may include a first Lynchpin structure 1010 and a second Lynchpin structure 1020. The two Lynchpin structures may be joined along three mated flanges 1032, 1034, and 1036. Each Lynchpin structure may include six pentangular surfaces, each of which may include a circular inner structure 1040. Each of the pentangular surfaces may include one or more propulsion devices as described herein. Each Lynchpin structure may include one or more external support structure arms 1050, such as the tetrahedrally supported Lynchpin structure 700 shown in FIG. 7.

Figure 11:
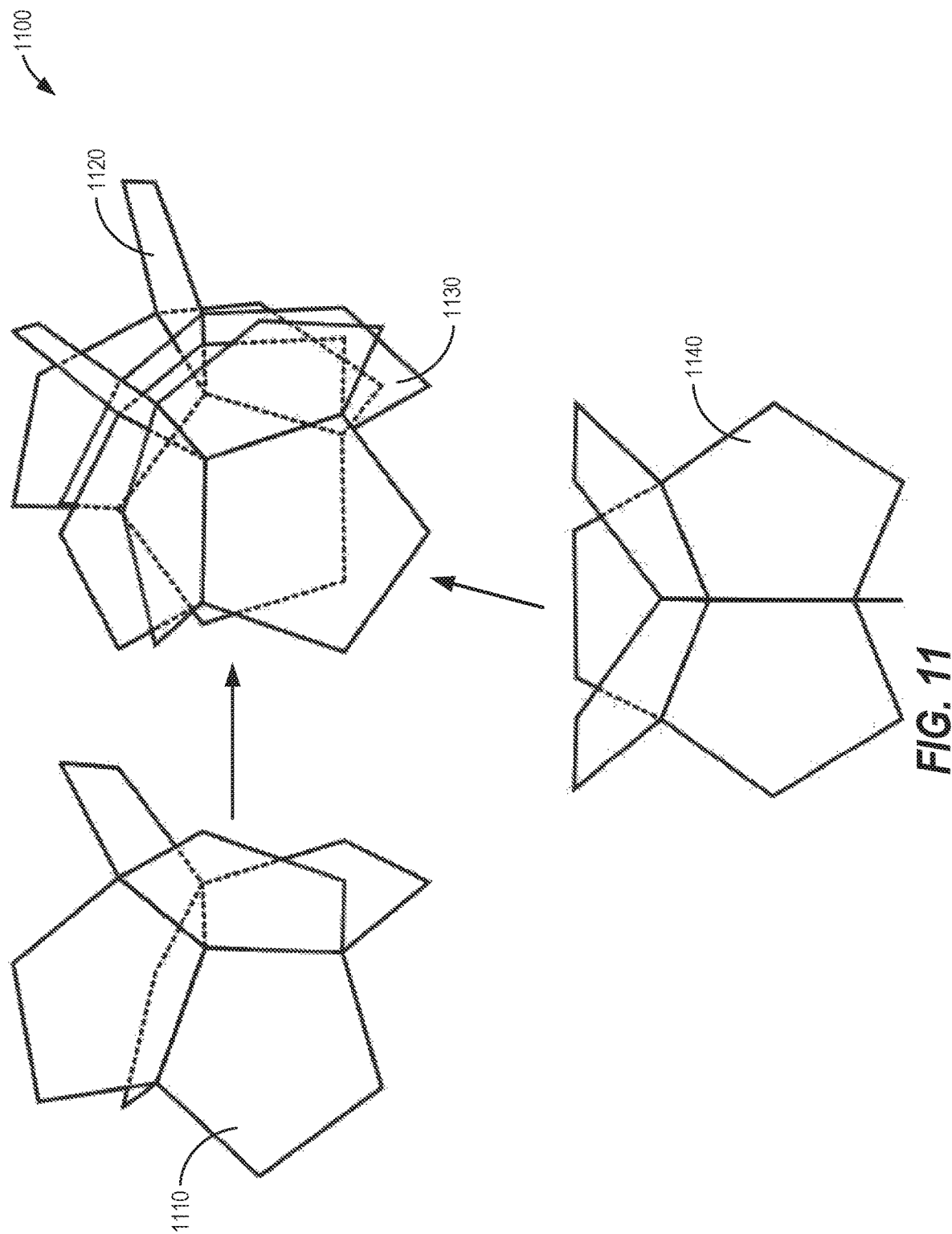
FIG. 11 is a perspective view of the formation of a modified dodecahedron, according to an embodiment.

FIG. 11 is a perspective view of the formation of a modified dodecahedron 1100, according to an embodiment. In the example shown in FIG. 11, the modified dodecahedron may be formed by combining four of the Lynchpin structures. As shown in FIG. 11, this includes a first structure 1110, a second structure 1120 joined to a third structure 1130, and a fourth structure 1140. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 12.

Figure 12:
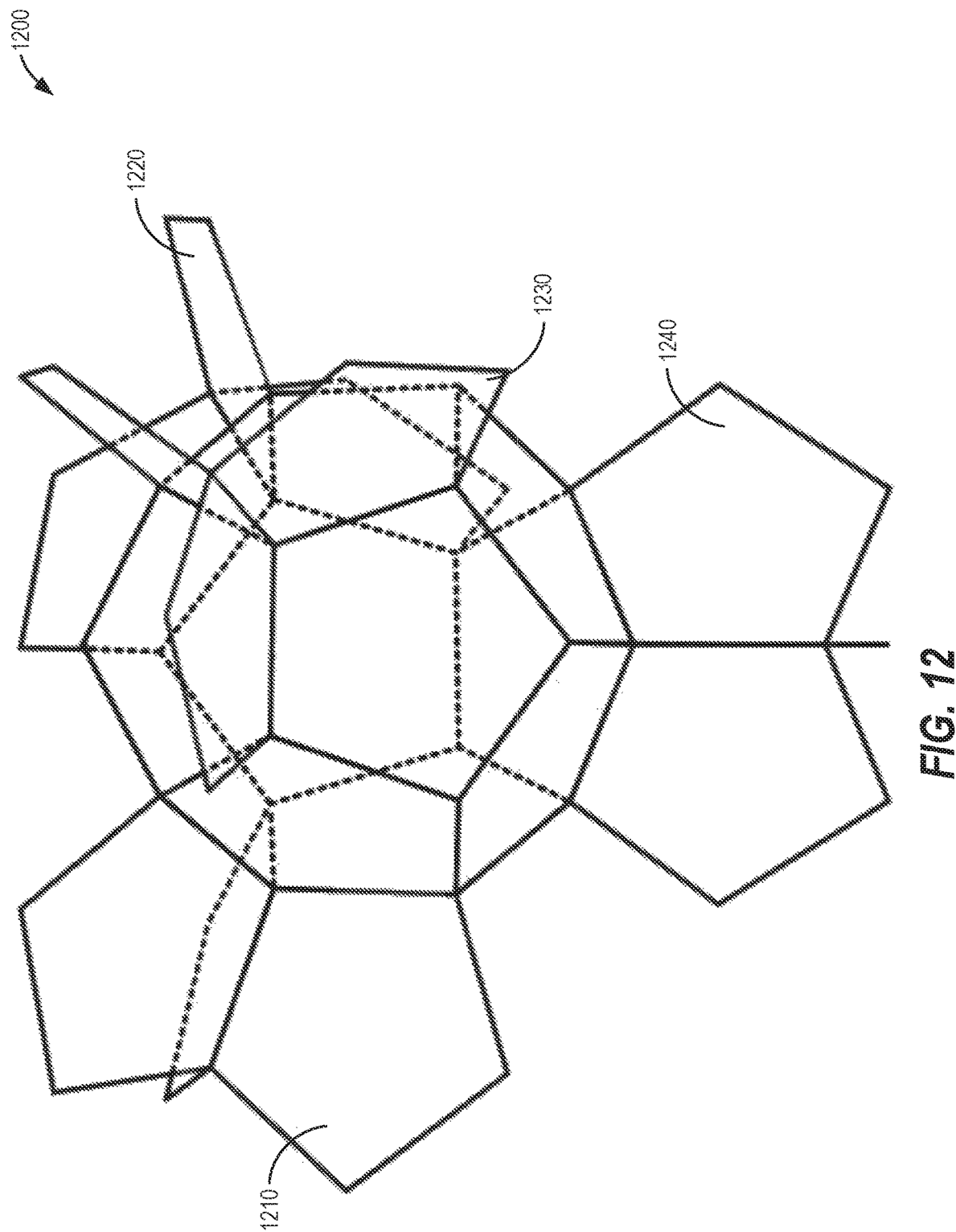
FIG. 12 is a perspective view of a modified dodecahedron, according to an embodiment.

FIG. 12 is a perspective view of a modified dodecahedron 1200, according to an embodiment. In the example shown in FIG. 12, the modified dodecahedron may be formed by combining four of the Lynchpin structures shown in FIG. 11. As shown in FIG. 12, this includes a first structure 1110, a second structure 1120 joined to a third structure 1130, and a fourth structure 1140. Various edges or surfaces may be joined using various forms of coupling, such as through magnetic, adhesive, or other forms of coupling. The modified dodecahedron 1200 may be used as a building block, and the planar surfaces extending beyond the twelve-sided dodecahedron surface may be used to combine two or more modified dodecahedrons.

Figure 13:
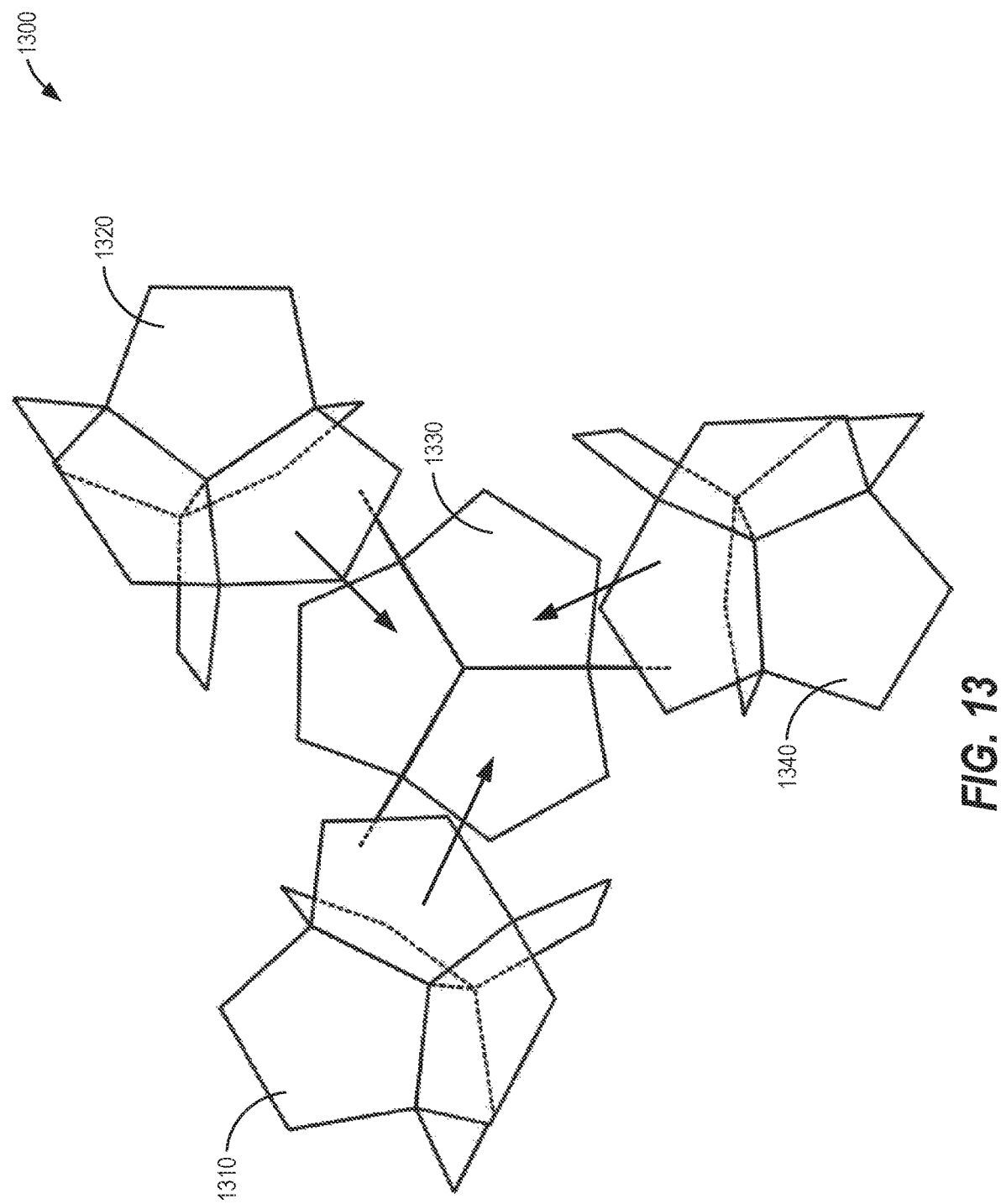
FIG. 13 is a perspective view of the formation of a modified dodecahedron, according to an embodiment.

FIG. 13 is a perspective view of the formation of a modified dodecahedron 1300, according to an embodiment. In the example shown in FIG. 13, the modified dodecahedron may be formed by combining four of the Lynchpin structures. As shown in FIG. 13, this includes a first structure 1310, a second structure 1320, a third structure 1330, and a fourth structure 1340. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 14.

Figure 14:
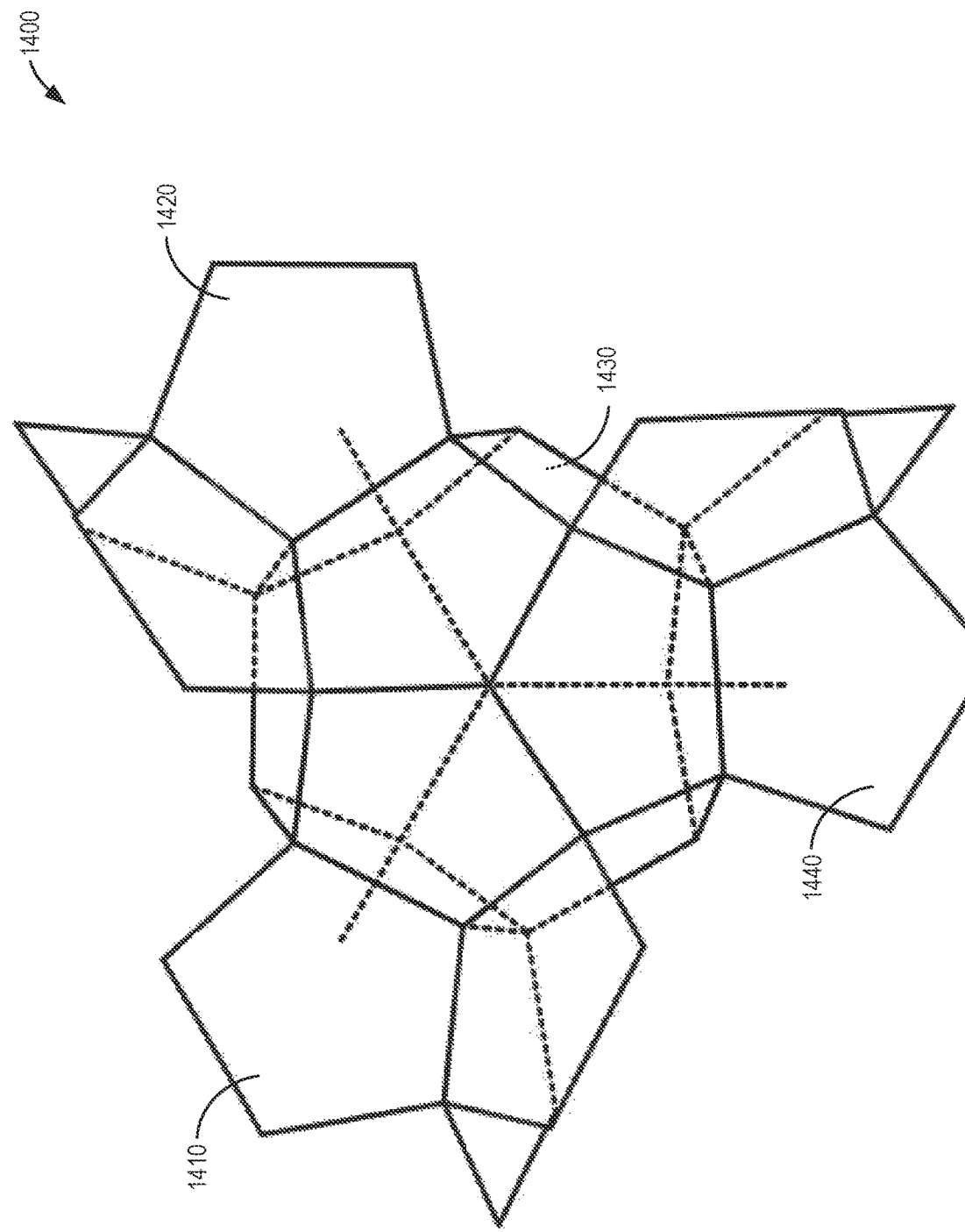
FIG. 14 is a perspective view of a modified dodecahedron, according to an embodiment.

FIG. 14 is a perspective view of a modified dodecahedron 1400, according to an embodiment. In the example shown in FIG. 14, the modified dodecahedron may be formed by combining four of the Lynchpin structures shown in FIG. 13. As shown in FIG. 14, this includes a first structure 1310, a second structure 1320 joined to a third structure 1330, and a fourth structure 1340. Various edges or surfaces may be joined using various forms of coupling, such as through magnetic, adhesive, or other forms of coupling. The modified dodecahedron 1400 may be used as a building block, and the planar surfaces extending beyond the twelve-sided dodecahedron surface may be used to combine two or more modified dodecahedrons.

Figure 15:
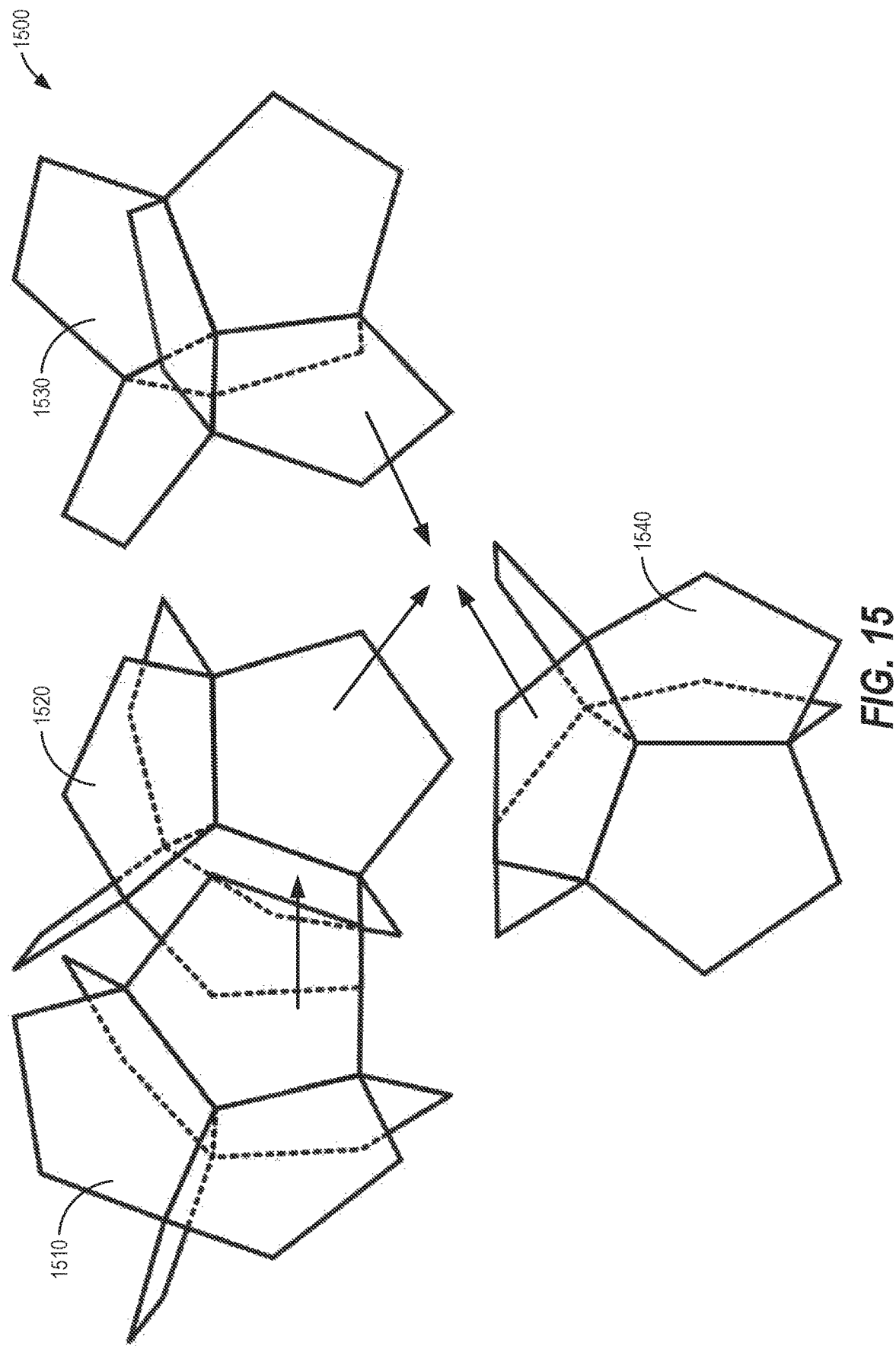
FIG. 15 is a perspective view of the formation of a modified dodecahedron, according to an embodiment.

FIG. 15 is a perspective view of the formation of a modified dodecahedron 1500, according to an embodiment.

In the example shown in FIG. 15, the modified dodecahedron may be formed by combining four of the Lynchpin structures. As shown in FIG. 15, this includes a first structure 1510, a second structure 1520, a third structure 1530, and a fourth structure 1540. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 16.

Figure 16:
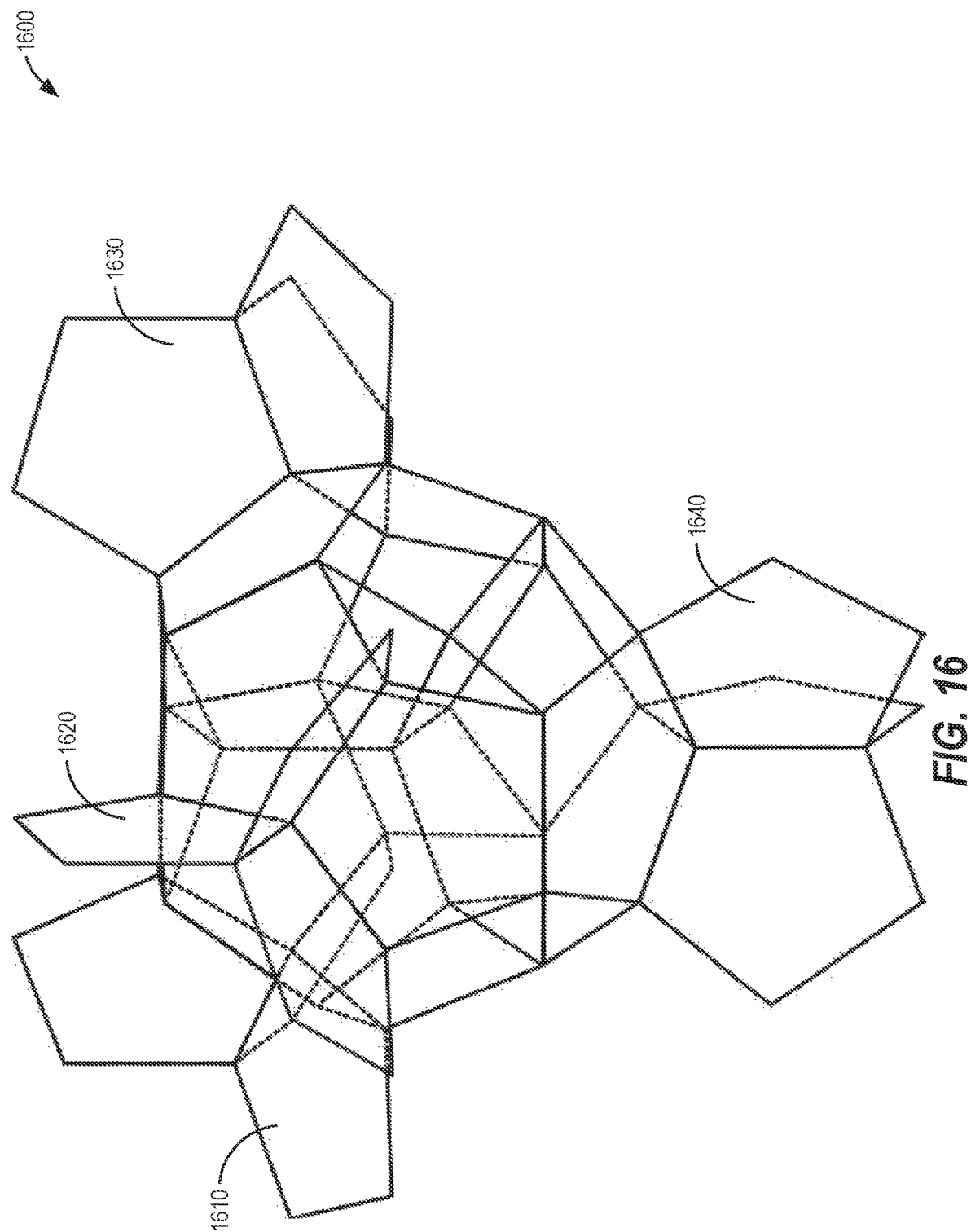
FIG. 16 is a perspective view of a modified dodecahedron, according to an embodiment.

FIG. 16 is a perspective view of a modified dodecahedron 1600, according to an embodiment. In the example shown in FIG. 16, the modified dodecahedron may be formed by combining four of the Lynchpin structures shown in FIG. 15. As shown in FIG. 16, this includes a first structure 1510, a second structure 1520 joined to a third structure 1530, and a fourth structure 1540. Various edges or surfaces may be joined using various forms of coupling, such as through magnetic, adhesive, or other forms of coupling. The modified dodecahedron 1600 may be used as a building block, and the planar surfaces extending beyond the twelve-sided dodecahedron surface may be used to combine two or more modified dodecahedrons.

Figure 17:
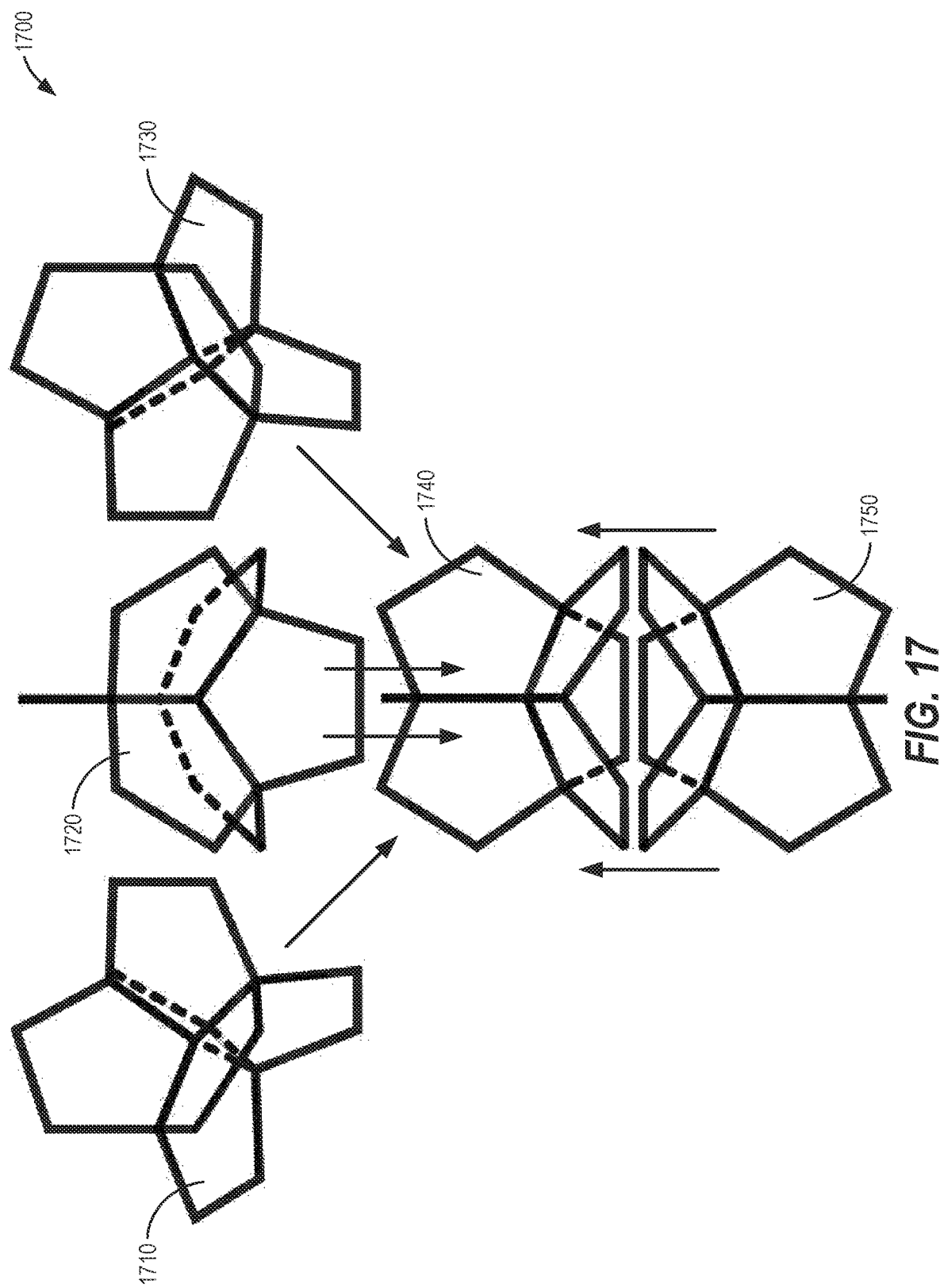
FIG. 17 is a perspective view of the formation of a modified dodecahedron, according to an embodiment.

FIG. 17 is a perspective view of the formation of a modified dodecahedron 1700, according to an embodiment. In the example shown in FIG. 17, the modified dodecahedron may be formed by combining five of the Lynchpin structures. As shown in FIG. 17, this includes a first structure 1710, a second structure 1720 joined to a third structure 1730, a fourth structure 1740, and a fifth structure 1740. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 18.

Figure 18:
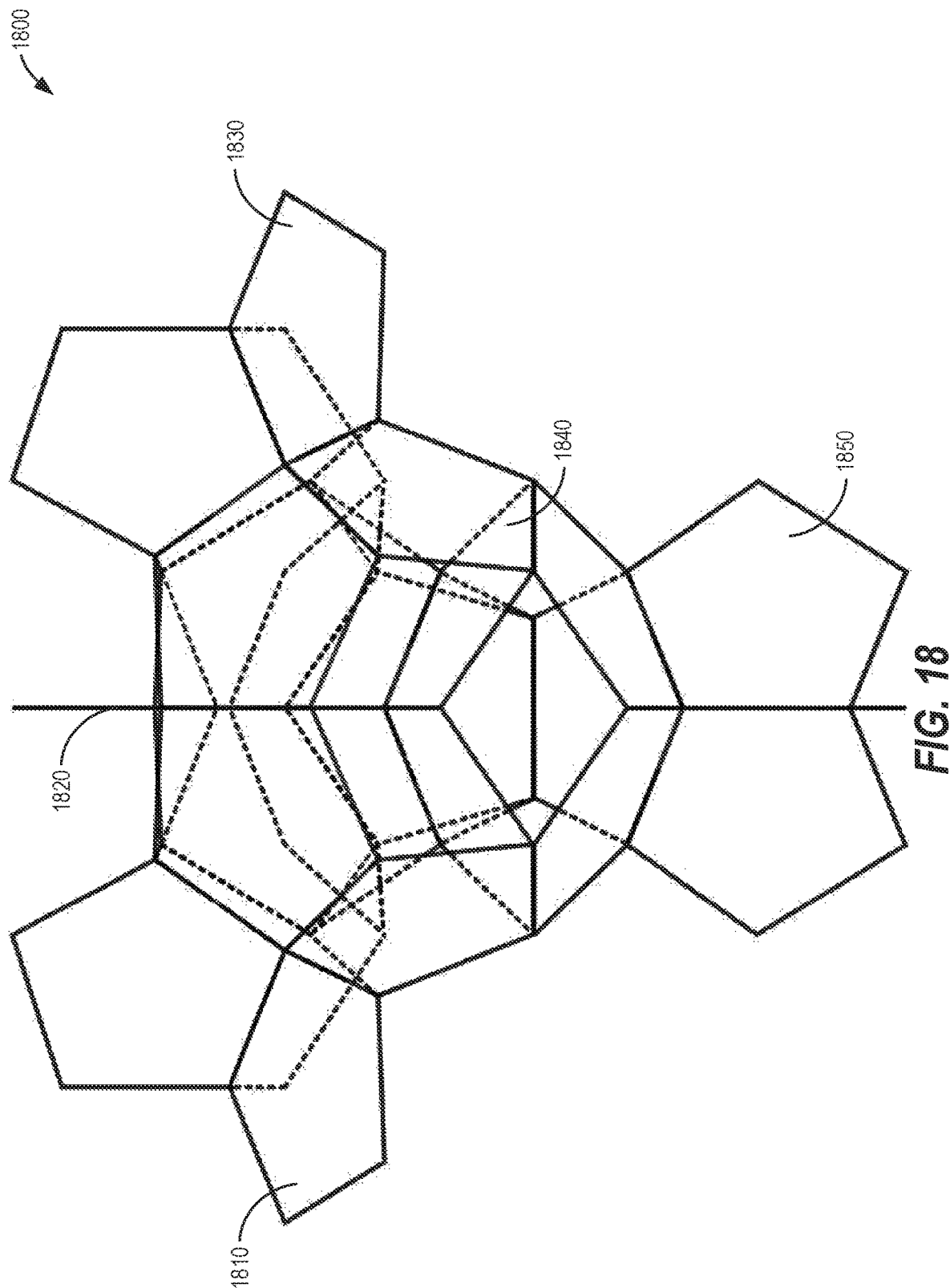
FIG. 18 is a perspective view of a modified dodecahedron, according to an embodiment.

FIG. 18 is a perspective view of a modified dodecahedron 1800, according to an embodiment. In the example shown in FIG. 18, the modified dodecahedron may be formed by combining five of the Lynchpin structures shown in FIG. 17. As shown in FIG. 18, this includes a first structure 1710, a second structure 1720 joined to a third structure 1730, a fourth structure 1740, and a fifth structure 1740. Various edges or surfaces may be joined using various forms of coupling, such as through magnetic, adhesive, or other forms of coupling. The modified dodecahedron 1800 may be used as a building block, and the planar surfaces extending beyond the twelve-sided dodecahedron surface may be used to combine two or more modified dodecahedrons.

Figure 19:
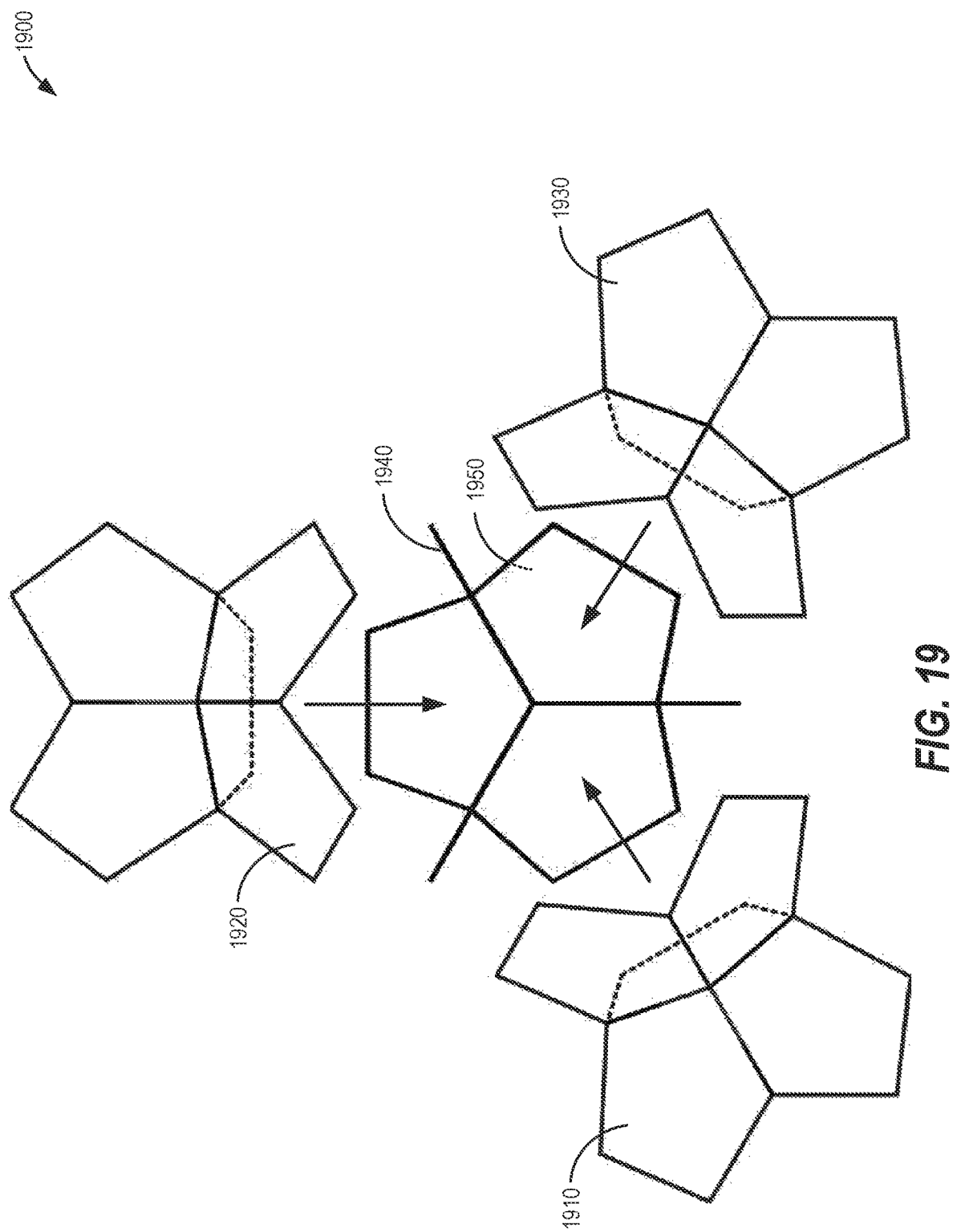
FIG. 19 is a perspective view of the formation of a modified dodecahedron, according to an embodiment.

FIG. 19 is a perspective view of the formation of a modified dodecahedron 1900, according to an embodiment. In the example shown in FIG. 19, the modified dodecahedron may be formed by combining five of the Lynchpin structures. As shown in FIG. 19, this includes a first structure 1910, a second structure 1920 joined to a third structure 1930, a fourth structure 1940, and a fifth structure 1940. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 20.

Figure 20:
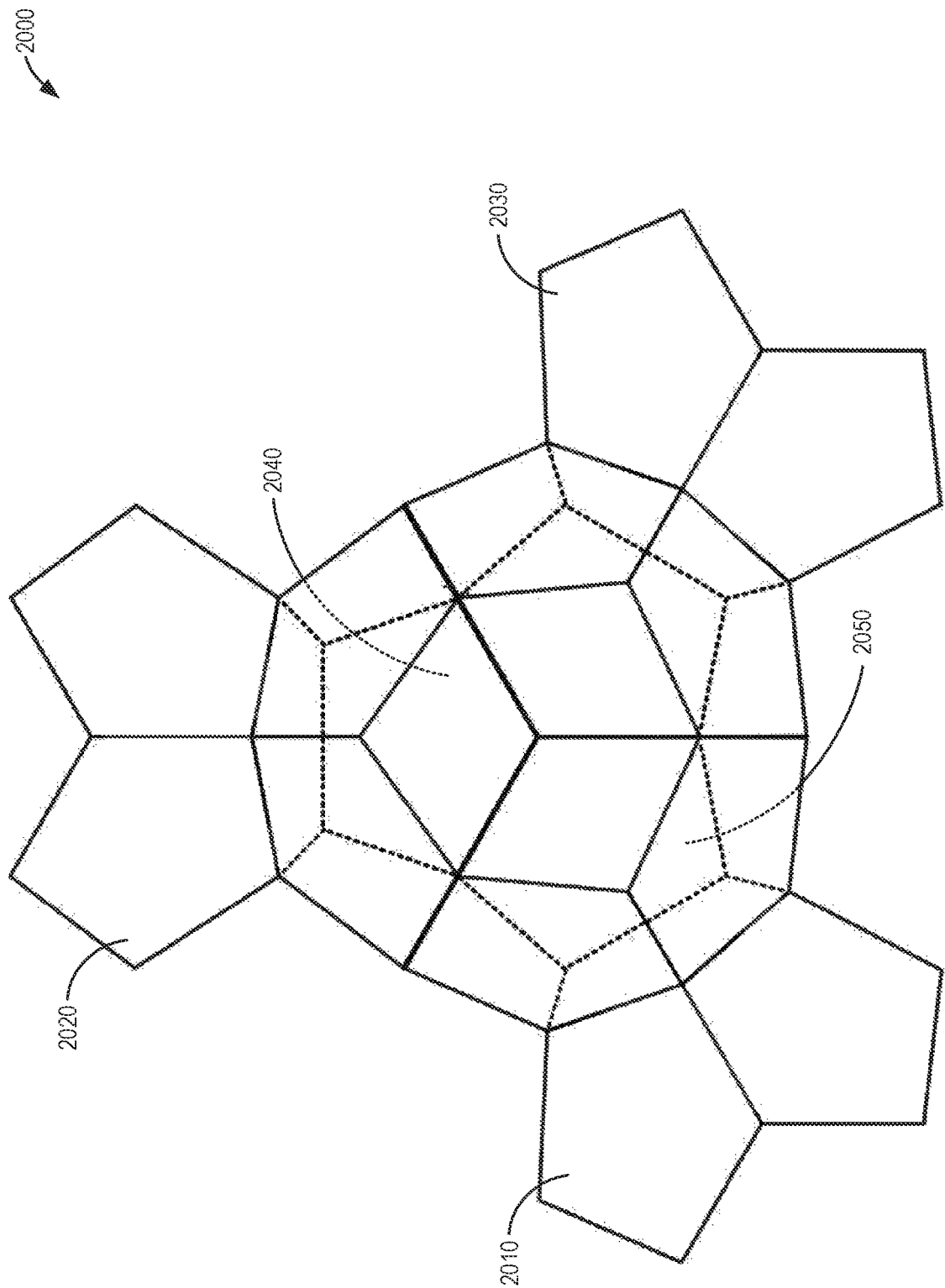
FIG. 20 is a perspective view of a modified dodecahedron, according to an embodiment.

FIG. 20 is a perspective view of a modified dodecahedron 2000, according to an embodiment. In the example shown in FIG. 20, the modified dodecahedron may be formed by combining five of the Lynchpin structures shown in FIG. 19. As shown in FIG. 20, this includes a first structure 1910, a second structure 1920 joined to a third structure 1930, a fourth structure 1940, and a fifth structure 1940. Various edges or surfaces may be joined using various forms of coupling, such as through magnetic, adhesive, or other forms of coupling. The modified dodecahedron 2000 may be used as a building block, and the planar surfaces extending beyond the twelve-sided dodecahedron surface may be used to combine two or more modified dodecahedrons.

Figure 21:
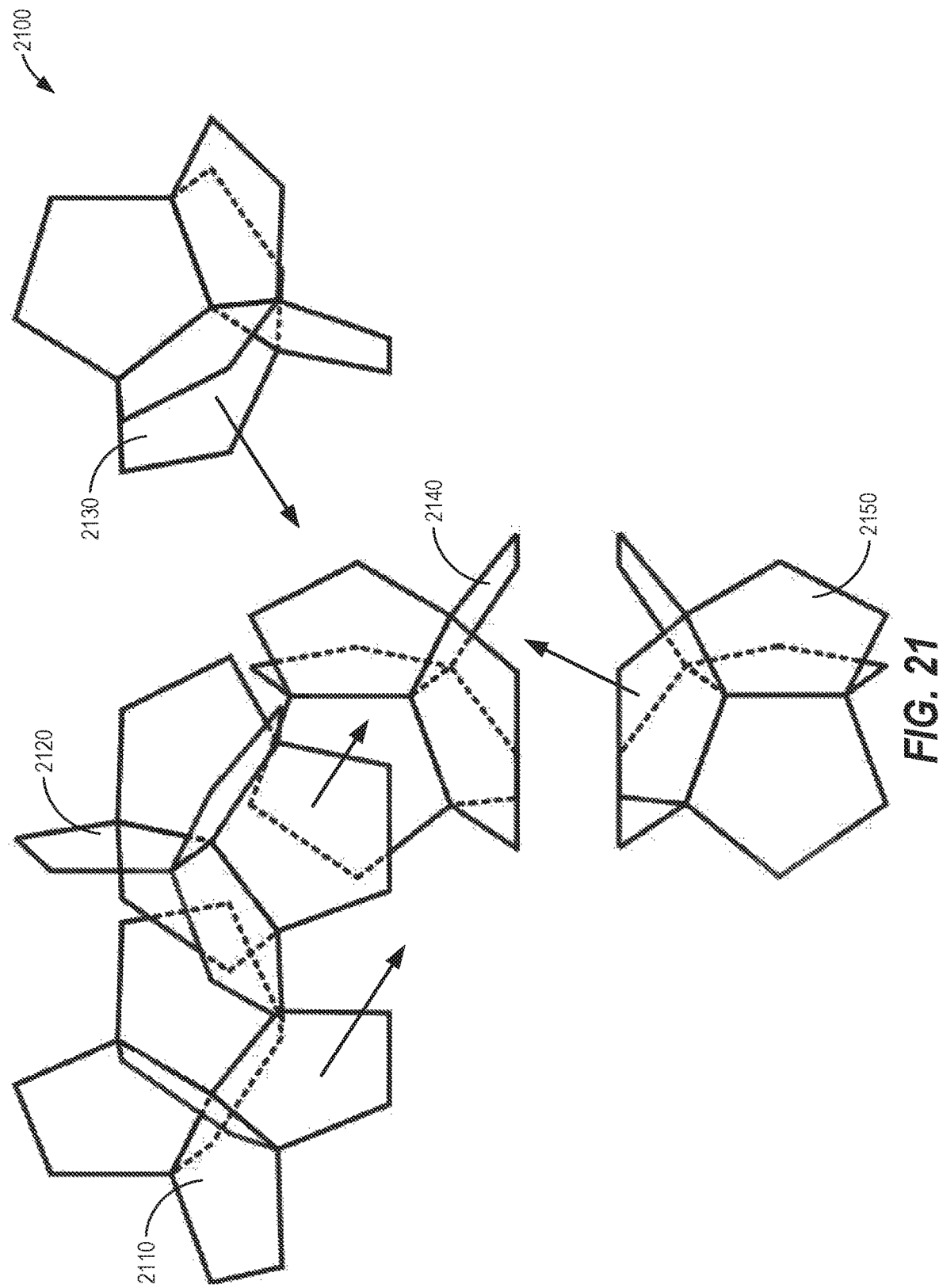
FIG. 21 is a perspective view of the formation of a modified dodecahedron, according to an embodiment.

FIG. 21 is a perspective view of the formation of a modified dodecahedron 2100, according to an embodiment. In the example shown in FIG. 21, the modified dodecahedron may be formed by combining five of the Lynchpin structures. As shown in FIG. 21, this includes a first structure 2110, a second structure 2120 joined to a third structure 2130, a fourth structure 2140, and a fifth structure 2140. Various surfaces may be moved into a selected position using one or more of various forms of induced motion, such as energizing electromagnetic components, inducing molecular excitation, radiation pressure (e.g., photon pressure), internal propulsion devices (e.g., a propeller), or other forms of induced motion. For example, applying a magnetic or electromagnetic field may cause one or more of the structures to move toward another structure. Various edges or surfaces may be joined using various forms of coupling, such as through magnetic, adhesive, or other forms of coupling. The four structures may combine to form a modified dodecahedron, such as shown in FIG. 22.

Figure 22:
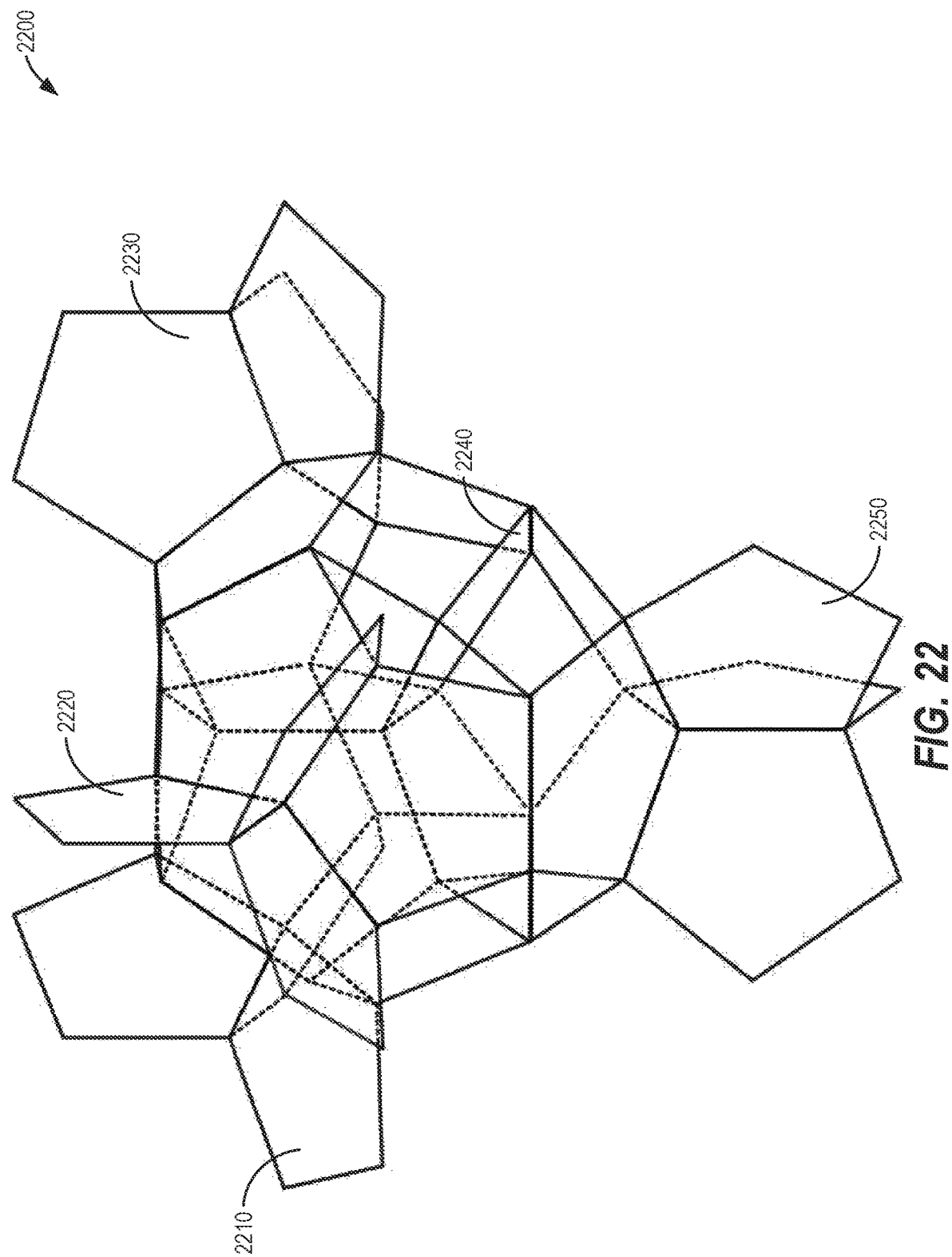
FIG. 22 is a perspective view of a modified dodecahedron, according to an embodiment.

FIG. 22 is a perspective view of a modified dodecahedron 2200, according to an embodiment. In the example shown in FIG. 22, the modified dodecahedron may be formed by combining five of the Lynchpin structures shown in FIG. 21. As shown in FIG. 22, this includes a first structure 2110, a second structure 2120 joined to a third structure 2130, a fourth structure 2140, and a fifth structure 2140. Various edges or surfaces may be joined using various forms of coupling, such as through magnetic, adhesive, or other forms of coupling. The modified dodecahedron 2200 may be used as a building block, and the planar surfaces extending beyond the twelve-sided dodecahedron surface may be used to combine two or more modified dodecahedrons.

Figure 23A:
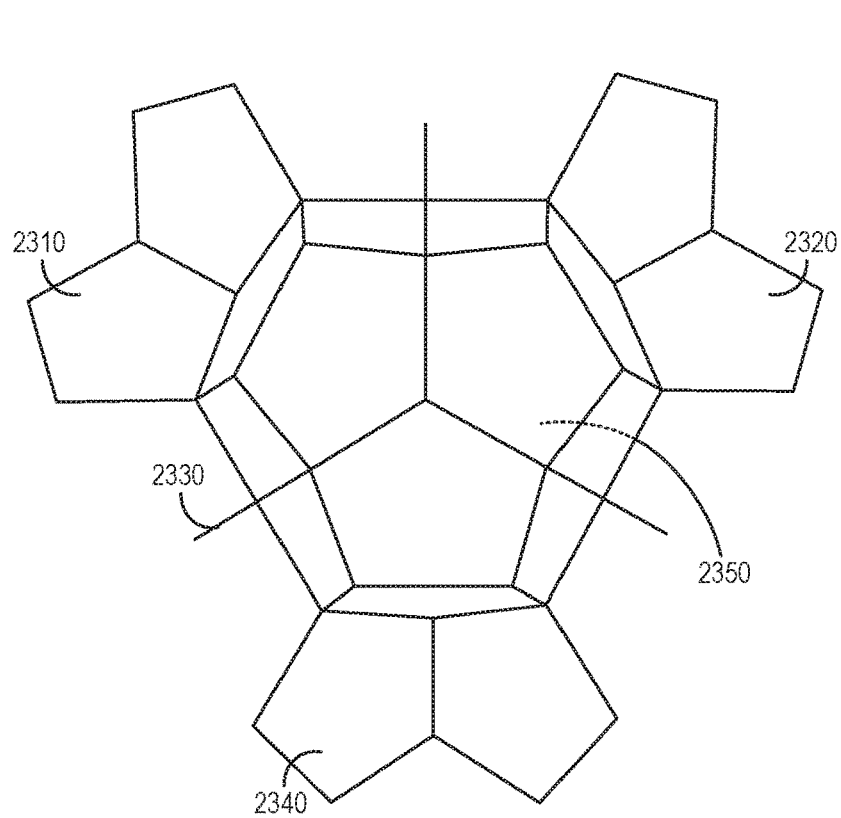
FIGS. 23A and 23B are perspective views of a modified compound Lynchpin structure, according to an embodiment.
Figure 23B:
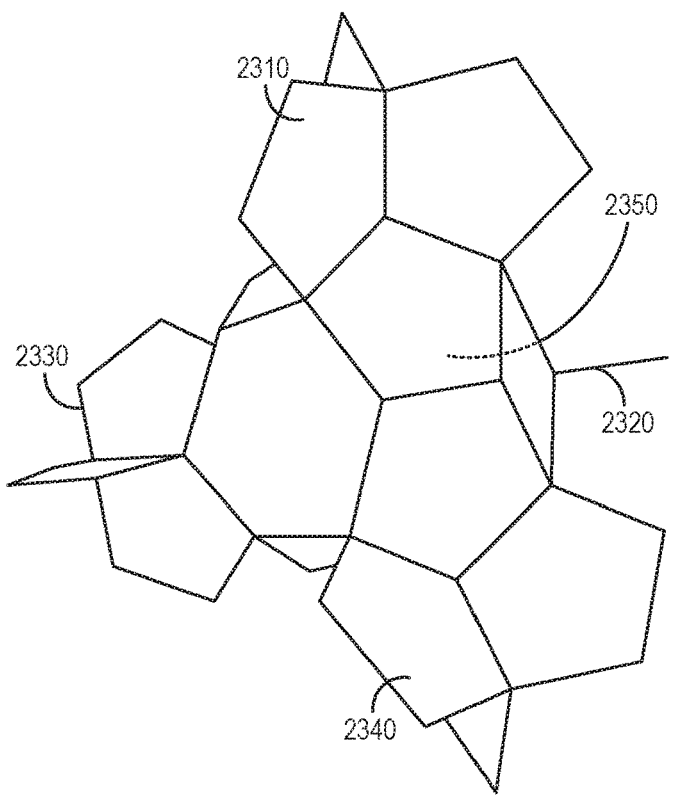

FIGS. 23A and 23B are perspective views of a modified compound Lynchpin structure 2300, according to an embodiment. FIG. 23A shows a first perspective view of a Lynchpin structure 2300, and FIG. 23A shows a first perspective view of a Lynchpin structure 2300, and FIG. 23B shows a second perspective view of the Lynchpin structure 2300. The Lynchpin structure 2300 may include four surface Lynchpin structures, as shown in various orientations in FIG. 23A as 2310, 2320, 2330, and 2340. The Lynchpin structure 2300 may include one internal Lynchpin structure 2350. Various surfaces may be moved into a selected position using magnetic or electromagnetic materials. For example, applying a magnetic or electromagnetic field may cause the object to be arranged into the modified dodecahedron 2300 shown in FIG. 23. Each modified dodecahedron 2300 may be used as a building block, and the planar surfaces extending beyond the twelve-sided dodecahedron surface may be used to combine two or more modified dodecahedrons 2300.

Figure 24:
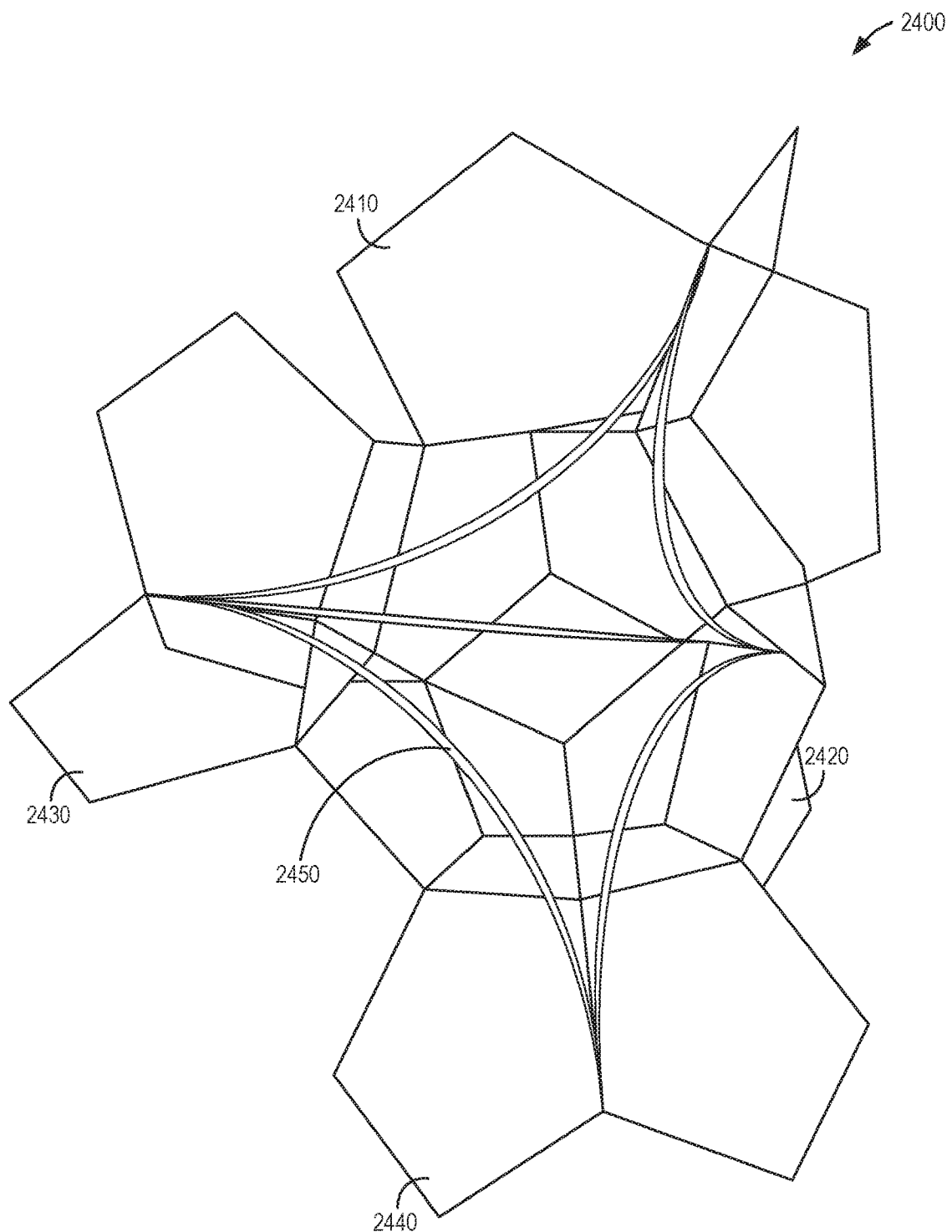
FIG. 24 is a perspective view of a modified dodecahedron formed from four Lynchpin structures, according to an embodiment.

FIG. 24 is a perspective view of a modified dodecahedron 2400 formed from four Lynchpin structures, according to an embodiment. A dodecahedron may include one or more Lynchpin surfaces. An inner dodecahedron may be formed from four of the Lynchpin structures, as shown in various orientations in FIG. 24 as 2410, 2420, 2430, and 2440. The Lynchpin structures may be joined together by a modified tetrahedral structure 2450. Various surfaces may be moved into a selected position using magnetic or electromagnetic materials. For example, applying a magnetic or electromagnetic field may cause the object to be arranged into the modified dodecahedron 2400 shown in FIG. 24. Each modified dodecahedron 2400 may be used as a building block, and the planar surfaces extending beyond the twelve-sided dodecahedron surface may be used to combine two or more modified dodecahedrons 2400.

In various embodiments, the Lynchpin structures or tetrahedral building blocks may be transparent, may be translucent, may include a semi-transparent material comprised of a color, or may include a solid (e.g., opaque) material. One or more light emitting diodes (LEDs) may be embedded within a planar surface. For example, LEDs may be connected to electrically conductive grid lines within the planar surfaces, and may receive power through the grid lines. Power may be provided to the LEDs through a power storage element (e.g., capacitor, battery) or through a power-generating element (e.g., solar cell, piezoelectric component). The electrically conductive grid lines may conduct power to the LEDs for lighting purposes. For example, the Lynchpin structure, the modified dodecahedron, or other structures described herein may be used as one or more light fixtures.

The electrically conductive grid lines may conduct power to the LEDs for educational purposes. For example, two enhanced devices may detect proximity using a magnetic or other proximity detection mechanism, and the proximity detection may convey power to the LEDs to indicate that the enhanced devices have been placed in the correct arrangement. The electrically conductive grid lines may serve as contour lines for educational purposes. For example, a two-dimensional surface with a grid pattern may be used to form one or more curved planar surfaces, and the curved planar surfaces will exhibit a visual distortion of the grid pattern according to the curvature of each surface. In another example, one or more planar surfaces may be formed using organic light emitting diodes (OLEDs) or liquid crystal displays (LCDs), and may display various human-readable or machine-readable information.

The Lynchpin structure may alter its appearance based on the presence of electrical current, an electric or magnetic field, sound vibration, or other external force. The Lynchpin structure may include one or more piezoelectric component, and this piezoelectric component may convert between mechanical and electrical inputs. A quartz piezoelectric element may be included at each of the vertices in the Lynchpin structure, and may be used to generate power for one or more LEDs. For example, sound vibration may be received through a planar surface or directly at a piezoelectric element, and the piezoelectric element may cause one or more LEDs to alter color or intensity according to the pattern of received sound vibration.

The piezoelectric element may be used for educational purposes. For example, two enhanced devices may detect proximity using a magnetic or other proximity detection mechanism, and the proximity detection may convey power to the piezoelectric element to generate a sound to indicate that the enhanced devices have been placed in the correct arrangement. One or more mechanical or electromechanical resonant devices may be used to modify, propagate, amplify, or mitigate externally applied vibration. For example, a mechanical tuning fork may be used to amplify vibration induced in a piezoelectric element.

In some embodiments, using electrochemical materials, application of an electrical current may transition one or more surfaces of the Lynchpin structure to translucent, clouded, or colored. A solid Lynchpin structure may be used to conduct vibration, such as in acoustic or other applications. For example, induced mechanical vibration may be used in vibration therapy. The Lynchpin structure may be constructed using a conductive material for various electrical applications. For example, one or more of the faces of the Lynchpin structure may be comprised of silicon, where the silicon is arranged to function as a resistor, inductor, capacitor, transistor, complete microchip (e.g., integrated circuit), or other electrical component. Multiple Lynchpin structures or tetrahedral building blocks may be arranged to propagate conducted vibration. For example, a mechanical vibration may be generated by applying an electric current to a piezoelectric element in a first structure, and this vibration may be conducted by the second structure and converted to an electrical impulse.

The Lynchpin structure may be made of a transparent material, and may be of a uniform or nonuniform thickness. The Lynchpin structure may include one or more photovoltaic cells, and may be used in solar power applications. For example, the cross-section of the Lynchpin structure may be convex or concave, and may be used as a lens in various optical applications. The Lynchpin structure may include various color patterns. Various additional ornamental designs may be used on each side of the Lynchpin structure. Various designs may include lines comprised of magnetic tape, where information may be encoded or transferred using the magnetic tape. For example, standard magnetic tape encoders and readers may be used to record or read information encoded on a magnetic tape stripe on an exterior surface. Various designs may include lines comprised of electrically conductive materials, such as copper. The Lynchpin structure may be constructed using a flexible material to allow the three faces to expand or contract.

The lines within each enhanced device may be uniformly distributed. For example, a circular enhanced template may include a series of arcs radiating from the circle center to the circle radius, where each arc is spaced apart from adjacent arcs by forty-five degrees. Enhanced devices corresponding to this circular two-dimensional enhanced template may have corresponding arc portions, and the arc portions may aid the user in arranging the enhanced devices on the template. In other embodiments, the grid lines may be irregular in shape or spacing, may be configured in a fractal pattern, or may be configured in another arrangement.

The inner space may include one or more gasses, such as noble gasses or gasses that are translucent or colored. The inner space may include one or more fluids (e.g., gasses or liquids). The fluid may be selected according to its response to heating or cooling. In another example, a fluid with a high heat capacity may store energy received from solar heating, such as in concentrated solar power applications. The fluid may be selected according to its ability to change color or light absorption. For example, a suspended particle fluid may transition from a clouded appearance to a translucent appearance in the presence of an electrical voltage. Various levels of transparency or various shades of color may be used. The use of semi-transparent materials of assorted colors may allow the colors to be combined depending on orientation. For example, if the device is held so a blue face is superimposed on a yellow face, the object may appear green. Similarly, multiple Lynchpin structures or tetrahedral building blocks may be combined to yield assorted colors. Multiple Lynchpin structures or tetrahedral building blocks may be combined to form the appearance of various platonic solids, where the platonic solid appearance may depend on each Lynchpin structure's specific periodicities of motion and wave positions in time as indicated by the direction of particular intersecting linear projections. For example, the vertices of multiple Lynchpin structures or tetrahedral building blocks may be combined to form a larger enhanced device.

The planar shapes may be collapsed or opened fully or partially through various methods. The planar shapes may be collapsed or opened by various active mechanical or electromechanical devices. These devices may include hydraulic actuators, servos, or other mechanical or electromechanical means. For example, the planar shapes or inner tetrahedral surfaces may contain magnetic or electromagnetic material, and one or more electromagnets may be energized selectively to collapse or open one or more planar shapes. An electromagnetic field may be used to cause movement of one or more planar shapes, or may be used to arrange two or more enhanced devices in a predetermined configuration. In embodiments where the planar shapes define an inner volume, the planar shapes may be collapsed or opened by heating or cooling a fluid (e.g., increasing or decreasing molecular vibration) contained within the enhanced device. For example, the fluid may be heated using solar energy, and the expanding fluid may fill the planar shapes and cause them to open. The planar shapes may be collapsed or opened by various passive methods, such as collapsing and opening opposing planar shapes alternatingly in response to a fluid. For example, a moving fluid such as wind may open a flange and cause the enhanced device to rotate around its axis of symmetry, and as the flange rotates into the wind, the wind may collapse that flange.

In some embodiments, the surfaces may also be collapsed or removed to allow nesting (e.g., stacking) of two or more Lynchpin structures or tetrahedral building blocks. Two or more Lynchpin structures or tetrahedral building blocks may be nested, and may be connected at one or more connection points via mechanical, magnetic, or by other means. For example, a magnetic flange may adhere to magnetic inner volume. Multiple enhanced devices may be nested on one or more of the vertices of the contracted triangular faces. For example, multiple devices may be nested on the three bottom vertices to form a tripod configuration, and multiple devices may be nested on the top vertex to form a vertical column. In an additional example, a second nested tripod configuration could be arranged on the vertical column, where each of the three tripod legs serves as a counterbalance for the other two tripod legs. Enhanced devices may be designed asymmetrically so that a series of Lynchpin structures or tetrahedral building blocks may be connected to form a circle, polygon, or other shape. Any combination of nested enhanced devices may be used to form larger structures. Nested enhanced structures may be expanded or reinforced by adding additional shapes.

Additional embodiments using regular polygons may have a number of sides that are integer multiples of three, including the hexagon with sixty-degree interior angles, a twelve-sided dodecahedron with thirty-degree interior angles, a twenty-four-sided icosikaitetragon with fifteen-degree interior angles, et cetera. Different three-dimensional Lynchpin structures or tetrahedral building blocks may be formed using any three or more two-dimensional shapes, including any combination of arbitrary shapes or regular or irregular close-chain polygons.

In some embodiments, multiple Lynchpin structures or tetrahedral building blocks may be connected to form a closed chain polygon (e.g., triangle, square, pentagon, etc.). The structures may be connected to each other by magnetic means, by soldering, or by other means. Alternatively, the Lynchpin structures or tetrahedral building blocks may be connected to a center hub using one or more spokes per Lynchpin structure. The connected structures may be configured to rotate around the center hub, such as in response to a fluid flow (e.g., gas or liquid). For example, the connected structures may be used in a turbine configuration, where each Lynchpin structure is configured to spill and catch air depending on the angles of the planar shapes and orientations of the enhanced devices to cause the connected Lynchpin structures or tetrahedral building blocks to rotate. As another example, the connected structures may be used in a water wheel configuration, where water may contact outer planar shapes and cause the connected structures to rotate. The structures may be adjusted to change the angular velocity, rotational direction, or other response of the connected structures to movement of a fluid across the surface of the enhanced devices. Adjustments may include collapsing or opening individual planar shapes, or extending or retracting the respective structures relative to the hub. In embodiments where the structures are formed from or include a framework comprised of a conductive material, the connected structures may be arranged to form an antenna, such as for terrestrial or satellite communication. The connected structures may be used to conduct vibration, such as in acoustic applications, vibration therapy, or other applications. Other hydrodynamic or aerodynamic applications may be used. In addition to these macroscopic applications for a single or multiple Lynchpin structures or tetrahedral building blocks, Lynchpin structures or tetrahedral building blocks may be used in various microscopic applications such as nanotechnology. For example, multiple microscopic Lynchpin structures or tetrahedral building blocks may be configured to arrange themselves in a predefined structure in the presence of a magnetic field. Similarly, multiple microscopic Lynchpin structures or tetrahedral building blocks may be permanently arranged in a microscopic structure with predetermined properties, such as a resistor, inductor, capacitor, transistor, complete microchip, or other electrical component.

This invention is intended to cover all changes and modifications of the example embodiments described herein that do not constitute departures from the scope of the claims.

Example 1 is a pentangular structure vehicle comprising: a first six-sided 3-D geometric structure including a first propulsion device; and a second six-sided 3-D geometric structure including a second propulsion device, the second six-sided 3-D geometric structure fixedly attached to the first six-sided 3-D geometric structure; wherein each six-sided 3-D geometric structure includes six substantially pentangular planar surfaces, each substantially pentangular planar surface joined along two adjacent edges to four adjacent substantially pentangular planar surfaces.

In Example 2, the subject matter of Example 1 optionally includes wherein: the first propulsion device is supported within a first pentangular planar surface on the first six-sided 3-D geometric structure; and the second propulsion device is supported within a second pentangular planar surface on the second six-sided 3-D geometric structure.

In Example 3, the subject matter of Example 2 optionally includes wherein the first propulsion device and the second propulsion device include a thrust device.

In Example 4, the subject matter of Example 3 optionally includes wherein thrust device include at least one of a propeller engine, a turbine engine, a jet engine, an ion propulsion device, a Hall effect propulsion device, a molecular excitation thrust device, and a maglev device.

In Example 5, the subject matter of any one or more of Examples 1-4 optionally include wherein: the first six-sided 3-D geometric structure includes a third propulsion device supported within a third pentangular planar surface on the first six-sided 3-D geometric structure; and the second six-sided 3-D geometric structure includes a fourth propulsion device supported within a fourth pentangular planar surface on the second six-sided 3-D geometric structure; wherein: the first and second propulsion devices provide a first propulsion type; the third and fourth propulsion devices provide a second propulsion type; and the first propulsion type is different from the second propulsion type.

In Example 6, the subject matter of any one or more of Examples 1-5 optionally include a plurality of control devices to direct the propulsion.

In Example 7, the subject matter of any one or more of Examples 1-6 optionally include wherein the plurality of control surfaces includes at least one of a gimble device, an adjustable aerodynamic control surface, and a restriction device.

In Example 8, the subject matter of any one or more of Examples 1-7 optionally include -D geometric structure along three pairs of adjacent flanges.

In Example 9, the subject matter of any one or more of Examples 1-8 optionally include -D geometric structures, wherein the first plurality of three-sided edge structural supports is configured to support a relative position of adjacent substantially pentangular structures.

In Example 10, the subject matter of Example 9 optionally includes wherein the plurality of tetrahedral vertex structural supports and the plurality of three-sided edge structural supports are configured to allow at least one of the substantially pentangular structures to collapse toward an adjacent substantially pentangular structure.

In Example 11, the subject matter of Example 10 optionally includes magnetic material embedded in at least one of the substantially pentangular structures to provide structural support for the six-sided pentangular structure.

In Example 12, the subject matter of any one or more of Examples 10-11 optionally include electromagnetic material embedded in at least one of the substantially pentangular structures.

In Example 13, the subject matter of Example 12 optionally includes wherein the electromagnetic material is configured, in response to receiving power, to cause at least one of the sixth substantially pentangular structures to collapse toward an adjacent substantially pentangular structure.

In Example 14, the subject matter of Example 13 optionally includes a piezoelectric element embedded in at least one of the substantially pentangular structures configured to generate an electric charge in response to vibration.

In Example 15, the subject matter of any one or more of Examples 13-14 optionally include wherein the piezoelectric element is electrically connected to the electromagnetic material and configured to cause at least one of the sixth substantially pentangular structures to collapse toward an adjacent substantially pentangular structure in response to the electric charge generated by piezoelectric element.

In Example 16, the subject matter of any one or more of Examples 14-15 optionally include a light emitting diode embedded in at least one of the substantially pentangular structures and electrically connected to the piezoelectric element, wherein the light emitting diode is configured to provide electroluminescence in response to the electric charge generated by piezoelectric element.

In Example 17, the subject matter of Example 16 optionally includes wherein the light emitting diode is a substantially planar organic light emitting diode.

In Example 18, the subject matter of any one or more of Examples 14-17 optionally include a first acoustic resonator embedded in at least one of the substantially pentangular structures to induce a vibration in the piezoelectric element.

In Example 19, the subject matter of Example 18 optionally includes wherein: the first acoustic resonator is tuned to resonate at a selected frequency; and the first acoustic resonator is configured to resonate sympathetically with a second acoustic resonator, and wherein the second acoustic resonator is external to the six-sided pentangular structure.

In Example 20, the subject matter of any one or more of Examples 12-19 optionally include wherein the electromagnetic material is configured, in response to receiving power, to generate a magnetic field directed in a selected direction.

In Example 21, the subject matter of any one or more of Examples 1-20 optionally include at least one electrically conductive line embedded in at least one of the substantially pentangular structures, wherein the at least one electrically conductive line is configured to convey power or generate an electromagnetic field.

In Example 22, the subject matter of any one or more of Examples 1-21 optionally include wherein the second subgroup is arranged to be connected to a first, second, and third external subgroups corresponding to a first, second, and third external six-sided pentangular structure to form a substantially regular dodecahedron.

In Example 23, the subject matter of Example 22 optionally includes a second plurality of tetrahedral vertex structural supports at each vertex of the a substantially regular dodecahedron, wherein the second plurality of tetrahedral vertex structural supports is configured to support adjacent substantially pentangular structures within the substantially regular dodecahedron.

In Example 24, the subject matter of any one or more of Examples 20-23 optionally include a second plurality of three-sided edge structural supports at each edge of the substantially regular dodecahedron, wherein the second plurality of three-sided edge structural supports is configured to support adjacent substantially pentangular structures within the substantially regular dodecahedron.

Example 25 is a method of making a pentangular structure vehicle, the method comprising: forming a first six-sided 3-D geometric structure from a first group of six substantially pentangular planar surfaces and a first propulsion device, each substantially pentangular planar surface joined along two adjacent edges to four adjacent substantially pentangular planar surfaces; forming a second six-sided 3-D geometric structure from a second group of six substantially pentangular planar surfaces and a second propulsion device, the second group of six substantially pentangular planar surfaces substantially congruent to the first group of six substantially pentangular planar surfaces; and fixedly attaching the first six-sided 3-D geometric structure to the second six-sided 3-D geometric structure to form a pentangular structure vehicle.

In Example 26, the subject matter of Example 25 optionally includes wherein: the first propulsion device is supported within a first pentangular planar surface on the first six-sided 3-D geometric structure; and the second propulsion device is supported within a second pentangular planar surface on the second six-sided 3-D geometric structure.

In Example 27, the subject matter of Example 26 optionally includes wherein the first propulsion device and the second propulsion device include a thrust device.

In Example 28, the subject matter of Example 27 optionally includes wherein thrust device include at least one of a propeller engine, a turbine engine, a jet engine, an ion propulsion device, a Hall effect propulsion device, a molecular excitation thrust device, and a maglev device.

In Example 29, the subject matter of any one or more of Examples 25-28 optionally include wherein: the first six-sided 3-D geometric structure includes a third propulsion device supported within a third pentangular planar surface on the first six-sided 3-D geometric structure; and the second six-sided 3-D geometric structure includes a fourth propulsion device supported within a fourth pentangular planar surface on the second six-sided 3-D geometric structure; wherein: the first and second propulsion devices provide a first propulsion type; the third and fourth propulsion devices provide a second propulsion type; and the first propulsion type is different from the second propulsion type.

In Example 30, the subject matter of any one or more of Examples 25-29 optionally include fixedly attaching a plurality of control devices to the pentangular structure vehicle, the plurality of control devices configured to direct the propulsion.

In Example 31, the subject matter of any one or more of Examples 25-30 optionally include wherein the plurality of control surfaces includes at least one of a gimble device, an adjustable aerodynamic control surface, and a restriction device.

In Example 32, the subject matter of any one or more of Examples 25-31 optionally include –D geometric structure along three pairs of adjacent flanges.

In Example 33, the subject matter of any one or more of Examples 25-32 optionally include wherein each of the first and second group of six substantially pentangular planar surfaces includes a first plurality of three-sided edge structural supports at each edge, wherein the first plurality of three-sided edge structural supports is configured to support a relative position of adjacent substantially pentangular structures.

In Example 34, the subject matter of Example 33 optionally includes wherein the plurality of tetrahedral vertex structural supports and the plurality of three-sided edge structural supports are configured to allow at least one of the substantially pentangular structures to collapse toward an adjacent substantially pentangular structure.

In Example 35, the subject matter of Example 34 optionally includes embedding a magnetic material in at least one of the substantially pentangular structures to provide structural support for the six-sided pentangular structure.

In Example 36, the subject matter of any one or more of Examples 34-35 optionally include embedding electromagnetic material in at least one of the substantially pentangular structures.

In Example 37, the subject matter of Example 36 optionally includes wherein the electromagnetic material is configured, in response to receiving power, to cause at least one of the sixth substantially pentangular structures to collapse toward an adjacent substantially pentangular structure.

In Example 38, the subject matter of Example 37 optionally includes embedding a piezoelectric element in at least one of the substantially pentangular structures configured to generate an electric charge in response to vibration.

In Example 39, the subject matter of any one or more of Examples 37-38 optionally include wherein the piezoelectric element is electrically connected to the electromagnetic material and configured to cause at least one of the sixth substantially pentangular structures to collapse toward an adjacent substantially pentangular structure in response to the electric charge generated by piezoelectric element.

In Example 40, the subject matter of any one or more of Examples 38-39 optionally include embedding a light emitting diode in at least one of the substantially pentangular structures and electrically connected to the piezoelectric element, wherein the light emitting diode is configured to provide electroluminescence in response to the electric charge generated by piezoelectric element.

In Example 41, the subject matter of Example 40 optionally includes wherein the light emitting diode is a substantially planar organic light emitting diode.

In Example 42, the subject matter of any one or more of Examples 38-41 optionally include embedding a first acoustic resonator in at least one of the substantially pentangular structures to induce a vibration in the piezoelectric element.

In Example 43, the subject matter of Example 42 optionally includes wherein: the first acoustic resonator is tuned to resonate at a selected frequency; and the first acoustic resonator is configured to resonate sympathetically with a second acoustic resonator, and wherein the second acoustic resonator is external to the six-sided pentangular structure.

In Example 44, the subject matter of any one or more of Examples 36-43 optionally include wherein the electromagnetic material is configured, in response to receiving power, to generate a magnetic field directed in a selected direction.

In Example 45, the subject matter of any one or more of Examples 25-44 optionally include embedding at least one electrically conductive line in at least one of the substantially pentangular structures, wherein the at least one electrically conductive line is configured to convey power or generate an electromagnetic field.

In Example 46, the subject matter of any one or more of Examples 25-45 optionally include wherein the second subgroup is arranged to be connected to a first, second, and third external subgroups corresponding to a first, second, and third external six-sided pentangular structure to form a substantially regular dodecahedron.

In Example 47, the subject matter of Example 46 optionally includes embedding a second plurality of tetrahedral vertex structural supports at each vertex of the a substantially regular dodecahedron, wherein the second plurality of tetrahedral vertex structural supports is configured to support adjacent substantially pentangular structures within the substantially regular dodecahedron.

In Example 48, the subject matter of any one or more of Examples 44-47 optionally include embedding a second plurality of three-sided edge structural supports at each edge of the substantially regular dodecahedron, wherein the second plurality of three-sided edge structural supports is configured to support adjacent substantially pentangular structures within the substantially regular dodecahedron.

Example 49 is one or more machine-readable medium including instructions, which when executed by a computing system, cause the computing system to perform any of the methods of Examples 25-48.

Example 50 is an apparatus comprising means for performing any of the methods of Examples 25-48.

Example 51 is a non-transitory machine-readable storage medium comprising a plurality of instructions that, when executed with a processor of a device, cause the device to: form a first six-sided 3-D geometric structure from a first group of six substantially pentangular planar surfaces and a first propulsion device, each substantially pentangular planar surface joined along two adjacent edges to four adjacent substantially pentangular planar surfaces; form a second six-sided 3-D geometric structure from a second group of six substantially pentangular planar surfaces and a second propulsion device, the second group of six substantially pentangular planar surfaces substantially congruent to the first group of six substantially pentangular planar surfaces; and fixedly attach the first six-sided 3-D geometric structure to the second six-sided 3-D geometric structure to form a pentangular structure vehicle.

In Example 52, the subject matter of Example 51 optionally includes wherein: the first propulsion device is supported within a first pentangular planar surface on the first six-sided 3-D geometric structure; and the second propulsion device is supported within a second pentangular planar surface on the second six-sided 3-D geometric structure.

In Example 53, the subject matter of Example 52 optionally includes wherein the first propulsion device and the second propulsion device include a thrust device.

In Example 54, the subject matter of Example 53 optionally includes wherein thrust device include at least one of a propeller engine, a turbine engine, a jet engine, an ion propulsion device, a Hall effect propulsion device, a molecular excitation thrust device, and a maglev device.

In Example 55, the subject matter of any one or more of Examples 51-54 optionally include wherein: the first six-sided 3-D geometric structure includes a third propulsion device supported within a third pentangular planar surface on the first six-sided 3-D geometric structure; and the second six-sided 3-D geometric structure includes a fourth propulsion device supported within a fourth pentangular planar surface on the second six-sided 3-D geometric structure; wherein: the first and second propulsion devices provide a first propulsion type; the third and fourth propulsion devices provide a second propulsion type; and the first propulsion type is different from the second propulsion type.

In Example 56, the subject matter of any one or more of Examples 51-55 optionally include fixedly attach a plurality of control devices to the pentangular structure vehicle, the plurality of control devices configured to direct the propulsion.

In Example 57, the subject matter of any one or more of Examples 51-56 optionally include wherein the plurality of control surfaces includes at least one of a gimble device, an adjustable aerodynamic control surface, and a restriction device.

In Example 58, the subject matter of any one or more of Examples 51-57 optionally include -D geometric structure along three pairs of adjacent flanges.

In Example 59, the subject matter of any one or more of Examples 51-58 optionally include wherein each of the first and second group of six substantially pentangular planar surfaces includes a first plurality of three-sided edge structural supports at each edge, wherein the first plurality of three-sided edge structural supports is configured to support a relative position of adjacent substantially pentangular structures.

In Example 60, the subject matter of Example 59 optionally includes wherein the plurality of tetrahedral vertex structural supports and the plurality of three-sided edge structural supports are configured to allow at least one of the substantially pentangular structures to collapse toward an adjacent substantially pentangular structure.

In Example 61, the subject matter of Example 60 optionally includes embed a magnetic material in at least one of the substantially pentangular structures to provide structural support for the six-sided pentangular structure.

In Example 62, the subject matter of any one or more of Examples 60-61 optionally include embed electromagnetic material in at least one of the substantially pentangular structures.

In Example 63, the subject matter of Example 62 optionally includes wherein the electromagnetic material is configured, in response to receiving power, to cause at least one of the sixth substantially pentangular structures to collapse toward an adjacent substantially pentangular structure.

In Example 64, the subject matter of Example 63 optionally includes embed a piezoelectric element in at least one of the substantially pentangular structures configured to generate an electric charge in response to vibration.

In Example 65, the subject matter of any one or more of Examples 63-64 optionally include wherein the piezoelectric element is electrically connected to the electromagnetic material and configured to cause at least one of the sixth substantially pentangular structures to collapse toward an adjacent substantially pentangular structure in response to the electric charge generated by piezoelectric element.

In Example 66, the subject matter of any one or more of Examples 64-65 optionally include embed a light emitting diode in at least one of the substantially pentangular structures and electrically connected to the piezoelectric element, wherein the light emitting diode is configured to provide electroluminescence in response to the electric charge generated by piezoelectric element.

In Example 67, the subject matter of Example 66 optionally includes wherein the light emitting diode is a substantially planar organic light emitting diode.

In Example 68, the subject matter of any one or more of Examples 64-67 optionally include embed a first acoustic resonator in at least one of the substantially pentangular structures to induce a vibration in the piezoelectric element.

In Example 69, the subject matter of Example 68 optionally includes wherein: the first acoustic resonator is tuned to resonate at a selected frequency; and the first acoustic resonator is configured to resonate sympathetically with a second acoustic resonator, and wherein the second acoustic resonator is external to the six-sided pentangular structure.

In Example 70, the subject matter of any one or more of Examples 62-69 optionally include wherein the electromagnetic material is configured, in response to receiving power, to generate a magnetic field directed in a selected direction.

In Example 71, the subject matter of any one or more of Examples 51-70 optionally include embed at least one electrically conductive line in at least one of the substantially pentangular structures, wherein the at least one electrically conductive line is configured to convey power or generate an electromagnetic field.

In Example 72, the subject matter of any one or more of Examples 51-71 optionally include wherein the second subgroup is arranged to be connected to a first, second, and third external subgroups corresponding to a first, second, and third external six-sided pentangular structure to form a substantially regular dodecahedron.

In Example 73, the subject matter of Example 72 optionally includes embed a second plurality of tetrahedral vertex structural supports at each vertex of the a substantially regular dodecahedron, wherein the second plurality of tetrahedral vertex structural supports is configured to support adjacent substantially pentangular structures within the substantially regular dodecahedron.

In Example 74, the subject matter of any one or more of Examples 70-73 optionally include embed a second plurality of three-sided edge structural supports at each edge of the substantially regular dodecahedron, wherein the second plurality of three-sided edge structural supports is configured to support adjacent substantially pentangular structures within the substantially regular dodecahedron.

Example 75 is an apparatus for making a pentangular structure vehicle, the apparatus comprising: means for forming a first six-sided 3-D geometric structure from a first group of six substantially pentangular planar surfaces and a first propulsion device, each substantially pentangular planar surface joined along two adjacent edges to four adjacent substantially pentangular planar surfaces; means for forming a second six-sided 3-D geometric structure from a second group of six substantially pentangular planar surfaces and a second propulsion device, the second group of six substantially pentangular planar surfaces substantially congruent to the first group of six substantially pentangular planar surfaces; and means for fixedly attaching the first six-sided 3-D geometric structure to the second six-sided 3-D geometric structure to form a pentangular structure vehicle.

In Example 76, the subject matter of Example 75 optionally includes wherein: the first propulsion device is supported within a first pentangular planar surface on the first six-sided 3-D geometric structure; and the second propulsion device is supported within a second pentangular planar surface on the second six-sided 3-D geometric structure.

In Example 77, the subject matter of Example 76 optionally includes wherein the first propulsion device and the second propulsion device include a thrust device.

In Example 78, the subject matter of Example 77 optionally includes wherein thrust device include at least one of a propeller engine, a turbine engine, a jet engine, an ion propulsion device, a Hall effect propulsion device, a molecular excitation thrust device, and a maglev device.

In Example 79, the subject matter of any one or more of Examples 75-78 optionally include wherein: the first six-sided 3-D geometric structure includes a third propulsion device supported within a third pentangular planar surface on the first six-sided 3-D geometric structure; and the second six-sided 3-D geometric structure includes a fourth propulsion device supported within a fourth pentangular planar surface on the second six-sided 3-D geometric structure; wherein: the first and second propulsion devices provide a first propulsion type; the third and fourth propulsion devices provide a second propulsion type; and the first propulsion type is different from the second propulsion type.

In Example 80, the subject matter of any one or more of Examples 75-79 optionally include means for fixedly attaching a plurality of control devices to the pentangular structure vehicle, the plurality of control devices configured to direct the propulsion.

In Example 81, the subject matter of any one or more of Examples 75-80 optionally include wherein the plurality of control surfaces includes at least one of a gimble device, an adjustable aerodynamic control surface, and a restriction device.

In Example 82, the subject matter of any one or more of Examples 75-81 optionally include -D geometric structure along three pairs of adjacent flanges.

In Example 83, the subject matter of any one or more of Examples 75-82 optionally include wherein each of the first and second group of six substantially pentangular planar surfaces includes a first plurality of three-sided edge structural supports at each edge, wherein the first plurality of three-sided edge structural supports is configured to support a relative position of adjacent substantially pentangular structures.

In Example 84, the subject matter of Example 83 optionally includes wherein the plurality of tetrahedral vertex structural supports and the plurality of three-sided edge structural supports are configured to allow at least one of the substantially pentangular structures to collapse toward an adjacent substantially pentangular structure.

In Example 85, the subject matter of Example 84 optionally includes means for embedding a magnetic material in at least one of the substantially pentangular structures to provide structural support for the six-sided pentangular structure.

In Example 86, the subject matter of any one or more of Examples 84-85 optionally include means for embedding electromagnetic material in at least one of the substantially pentangular structures.

In Example 87, the subject matter of Example 86 optionally includes wherein the electromagnetic material is configured, in response to receiving power, to cause at least one of the sixth substantially pentangular structures to collapse toward an adjacent substantially pentangular structure.

In Example 88, the subject matter of Example 87 optionally includes means for embedding a piezoelectric element in at least one of the substantially pentangular structures configured to generate an electric charge in response to vibration.

In Example 89, the subject matter of any one or more of Examples 87-88 optionally include wherein the piezoelectric element is electrically connected to the electromagnetic material and configured to cause at least one of the sixth substantially pentangular structures to collapse toward an adjacent substantially pentangular structure in response to the electric charge generated by piezoelectric element.

In Example 90, the subject matter of any one or more of Examples 88-89 optionally include means for embedding a light emitting diode in at least one of the substantially pentangular structures and electrically connected to the piezoelectric element, wherein the light emitting diode is configured to provide electroluminescence in response to the electric charge generated by piezoelectric element.

In Example 91, the subject matter of Example 90 optionally includes wherein the light emitting diode is a substantially planar organic light emitting diode.

In Example 92, the subject matter of any one or more of Examples 88-91 optionally include means for embedding a first acoustic resonator in at least one of the substantially pentangular structures to induce a vibration in the piezoelectric element.

In Example 93, the subject matter of Example 92 optionally includes wherein: the first acoustic resonator is tuned to resonate at a selected frequency; and the first acoustic resonator is configured to resonate sympathetically with a second acoustic resonator, and wherein the second acoustic resonator is external to the six-sided pentangular structure.

In Example 94, the subject matter of any one or more of Examples 86-93 optionally include wherein the electromagnetic material is configured, in response to receiving power, to generate a magnetic field directed in a selected direction.

In Example 95, the subject matter of any one or more of Examples 75-94 optionally include means for embedding at least one electrically conductive line in at least one of the substantially pentangular structures, wherein the at least one electrically conductive line is configured to convey power or generate an electromagnetic field.

In Example 96, the subject matter of any one or more of Examples 75-95 optionally include wherein the second subgroup is arranged to be connected to a first, second, and third external subgroups corresponding to a first, second, and third external six-sided pentangular structure to form a substantially regular dodecahedron.

In Example 97, the subject matter of Example 96 optionally includes means for embedding a second plurality of tetrahedral vertex structural supports at each vertex of the a substantially regular dodecahedron, wherein the second plurality of tetrahedral vertex structural supports is configured to support adjacent substantially pentangular structures within the substantially regular dodecahedron.

In Example 98, the subject matter of any one or more of Examples 94-97 optionally include means for embedding a second plurality of three-sided edge structural supports at each edge of the substantially regular dodecahedron, wherein the second plurality of three-sided edge structural supports is configured to support adjacent substantially pentangular structures within the substantially regular dodecahedron.

Example 99 is one or more machine-readable medium including instructions, which when executed by a machine, cause the machine to perform operations of any of the operations of Examples 1-98.

Example 100 is an apparatus comprising means for performing any of the operations of Examples 1-98.

Example 101 is a system to perform the operations of any of the Examples 1-98.

Example 102 is a method to perform the operations of any of the Examples 1-98.

What is claimed is:

1. A pentangular structure vehicle comprising:
a first six-sided 3-D geometric structure including a first, propulsion device; and a second six-sided 3-D geometric structure including a second propulsion device, the second six-sided 3-D geometric structure fixedly attached to the first six-sided 3-D geometric structure;
wherein each six-sided 3-D geometric structure includes six pentangular planar surfaces joined at a common vertex at the center of each six-sided 3-D geometric structure, each pentangular planar surface joined along two adjacent edges to four adjacent pentangular planar surfaces.

2. The pentangular structure vehicle of claim 1, wherein:
the first propulsion device is supported within a first pentangular planar surface on the first six-sided 3-D geometric structure; and
the second propulsion device is supported within a second pentangular planar surface on the second six-sided 3-D geometric structure.

3. The pentangular structure vehicle of claim 2, wherein the first propulsion device and the second propulsion device include a thrust device.

4. The pentangular structure vehicle of claim 3, wherein thrust device include at least one of a propeller engine, a turbine engine, a jet engine, an ion propulsion device, a Hall effect propulsion device, a molecular excitation thrust device, and a maglev device.

5. The pentangular structure vehicle of claim 1, wherein:
the first six-sided 3-D geometric structure includes a third propulsion device supported within a third pentangular planar surface on the first six-sided 3-D geometric structure; and
the second six-sided 3-D geometric structure includes a fourth propulsion device supported within a fourth pentangular planar surface on the second six-sided 3-D geometric structure;
wherein:
the first and second propulsion devices provide a first propulsion type;
the third and fourth propulsion devices provide a second propulsion type; and
the first propulsion type is different from the second propulsion type.

6. The pentangular structure vehicle of claim 1, further including a plurality of control devices to direct the propulsion.

7. The pentangular structure vehicle of claim 6, wherein the plurality of control devices includes at least one of a gimble device, an adjustable aerodynamic control surface, and a restriction device.

8. The pentangular structure vehicle of claim 1, wherein the second six-sided 3-D geometric structure is fixedly attached to the first six-sided 3-D geometric structure along three pairs of adjacent sides.

* * * * *